US011467860B2

(12) United States Patent
Craig et al.

(10) Patent No.: US 11,467,860 B2
(45) Date of Patent: *Oct. 11, 2022

(54) OPTIMIZED DATA RESOLUTION FOR WEB COMPONENTS

(71) Applicant: Salesforce.com, Inc., San Francisco, CA (US)

(72) Inventors: Erik Craig, Durham, NC (US); Matt Buland, San Francisco, CA (US); Helen Gawor, Raleigh, NC (US); Kurtis Martin, Durham, NC (US); Joel Benjamin Allen, San Francisco, CA (US); Darrell Bleakley, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 2 days.

This patent is subject to a terminal disclaimer.

(21) Appl. No.: 17/160,052

(22) Filed: Jan. 27, 2021

(65) Prior Publication Data

US 2022/0237012 A1    Jul. 28, 2022

(51) Int. Cl.
*G06F 9/455* (2018.01)
*G06F 16/901* (2019.01)
*G06F 40/143* (2020.01)
*G06F 9/54* (2006.01)

(52) U.S. Cl.
CPC .......... *G06F 9/45529* (2013.01); *G06F 9/547* (2013.01); *G06F 16/9024* (2019.01); *G06F 40/143* (2020.01)

(58) Field of Classification Search
None
See application file for complete search history.

(56) References Cited

U.S. PATENT DOCUMENTS

| 7,072,984 | B1 | 7/2006 | Polonsky |
| 9,026,903 | B1 | 5/2015 | Constantinos |
| 9,047,202 | B1* | 6/2015 | Hao ................ G06F 17/10 |
| 9,588,739 | B2 | 3/2017 | Cuomo et al. |
| 9,740,368 | B1* | 8/2017 | Love .............. G06F 3/04817 |
| 10,116,660 | B2 | 10/2018 | Chasman et al. |
| 10,129,258 | B2 | 11/2018 | Chasman et al. |
| 10,146,597 | B2 | 12/2018 | Pack et al. |

(Continued)

FOREIGN PATENT DOCUMENTS

WO     2020223268 A1    11/2020

OTHER PUBLICATIONS

U.S. Appl. No. 16/450,582, filed Jun. 24, 2019, Kevin Venkiteswaran.

(Continued)

*Primary Examiner* — Qing Chen
(74) *Attorney, Agent, or Firm* — Kwan & Olynick LLP

(57) ABSTRACT

An abstract data graph may be constructed at a server. The abstract data graph may include nodes and links between nodes and may represent computer programming instructions for generating a graphical user interface at a client machine. At least some of the links may represent dependency relationships between portions of the graphical user interface. The abstract data graph may be resolved at the client machine to identify data items, which may be retrieved from the server and used to render the graphical user interface.

20 Claims, 17 Drawing Sheets

(56) References Cited

U.S. PATENT DOCUMENTS

| | | |
|---|---|---|
| 10,769,521 B1 | 9/2020 | Yu |
| 10,904,105 B2 | 1/2021 | Venkiteswaran et al. |
| 10,911,324 B2 | 2/2021 | Venkiteswaran et al. |
| 11,182,536 B2 | 11/2021 | Frye |
| 2002/0165870 A1 | 11/2002 | Chakraborty et al. |
| 2004/0148586 A1 | 7/2004 | Gilboa |
| 2005/0044490 A1* | 2/2005 | Massasso ............... G06F 40/106 715/234 |
| 2005/0235261 A1* | 10/2005 | Krebs ..................... G06F 9/451 717/118 |
| 2006/0156314 A1 | 7/2006 | Waldorf |
| 2006/0294499 A1* | 12/2006 | Shim ........................ G06F 8/10 717/107 |
| 2007/0157096 A1 | 7/2007 | Keren et al. |
| 2008/0162552 A1 | 7/2008 | Bonev |
| 2008/0163124 A1* | 7/2008 | Bonev ..................... G06F 9/451 714/E11.207 |
| 2010/0138420 A1* | 6/2010 | Bator ..................... G06F 16/26 707/737 |
| 2010/0257457 A1 | 10/2010 | Goes |
| 2012/0209947 A1* | 8/2012 | Glaser ................... G06F 9/5027 709/217 |
| 2012/0229466 A1* | 9/2012 | Riche .................. G06F 16/9038 345/440 |
| 2014/0136954 A1* | 5/2014 | Ligman ................... G06F 17/00 715/234 |
| 2014/0156681 A1 | 6/2014 | Lee et al. |
| 2015/0120359 A1 | 4/2015 | Dongieux |
| 2015/0363492 A1 | 12/2015 | Laredo et al. |
| 2015/0370445 A1* | 12/2015 | Wang .................... G06F 16/986 715/765 |
| 2016/0026372 A1* | 1/2016 | Arvindam ............... G06F 9/451 715/762 |
| 2016/0125042 A1 | 5/2016 | Laredo et al. |
| 2016/0246467 A1 | 8/2016 | Jemiolo et al. |
| 2017/0139656 A1 | 5/2017 | Sterling et al. |
| 2017/0277768 A1* | 9/2017 | Doan ................ G06F 16/24578 |
| 2018/0018402 A1* | 1/2018 | Vogler .................. G06F 16/282 |
| 2018/0060371 A1 | 3/2018 | Venkiteswaran et al. |
| 2018/0109434 A1 | 4/2018 | Venkiteswaran et al. |
| 2018/0124027 A1 | 5/2018 | Venkiteswaran et al. |
| 2018/0181556 A1 | 6/2018 | Chang et al. |
| 2019/0036929 A1 | 1/2019 | Chasman et al. |
| 2019/0266226 A1 | 8/2019 | Kirn |
| 2019/0332667 A1 | 10/2019 | Williams et al. |
| 2020/0042294 A1 | 2/2020 | Elango et al. |
| 2020/0074800 A1 | 3/2020 | Olive |
| 2020/0349207 A1 | 11/2020 | Venkiteswaran et al. |
| 2020/0349221 A1 | 11/2020 | Venkiteswaran et al. |
| 2020/0351175 A1 | 11/2020 | Venkiteswaran et al. |
| 2020/0351176 A1 | 11/2020 | Venkiteswaran et al. |
| 2022/0067538 A1 | 3/2022 | Choudhary |

OTHER PUBLICATIONS

U.S. Appl. No. 16/450,592, filed Jun. 24, 2019, Kevin Venkiteswaran.
U.S. Appl. No. 16/450,598, filed Jun. 24, 2019, Kevin Venkiteswaran.
U.S. Appl. No. 16/450,544, Notice Of Allowance And Fees Due (Ptol-85), dated Nov. 27, 2020, 8 pgs.
U.S. Appl. No. 16/450,544, Final Rejection, dated Oct. 16, 2020, 9 Pgs.
U.S. Appl. No. 16/450,544, Non-Final Rejection, dated Jun. 24, 2020, 17 pgs.
U.S. Appl. No. 16/450,592, Notice Of Allowance And Fees Due (Ptol-85), dated Nov. 17, 2020, 7 pgs.
U.S. Appl. No. 16/450,592, Final Rejection, dated Jul. 9, 2020, 22 pgs.
U.S. Appl. No. 16/450,592, Non-Final Rejection, dated Mar. 19, 2020, 21 pgs.
U.S. Appl. No. 16/450,598, Final Rejection, dated Nov. 4, 2020, 15 pgs.
U.S. Appl. No. 16/450,598, Non-Final Rejection, dated Jul. 8, 2020, 13 pgs.
Int'l Application Serial No. PCT/US20/30340, Int'l Search Report and Written Opinion dated Sep. 29, 2020, 19 pgs.
Losoviz, Leonardo: "Introducing the Component-Based API—Smashing Magazine"Jan. 21, 2019.
Stewart, Blaize How To Do Data Binding in Pure JavaScript—Wintellect:Apr. 12, 2018.
Office Action dated Apr. 12, 2022 for U.S. Appl. No. 17/160,039 (pp. 1-31).
Notice of Allowance dated Jun. 15, 2022 for U.S. Appl. No. 17/160,039 (pp. 1-18).
Office Action dated Jun. 14, 2022 for U.S. Appl. No. 17/159,745 (pp. 1-23).

* cited by examiner

US 11,467,860 B2

OPTIMIZED DATA RESOLUTION FOR WEB COMPONENTS

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever

FIELD OF TECHNOLOGY

This patent document relates generally to database systems and more specifically to client-server interactions for presenting information stored in database systems.

BACKGROUND

"Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks.

One example of a cloud computing service is a database system. A database system in an on-demand computing services environment may be used to provide information to a variety of client machines via the internet. Much of that information may be presented in complex interactive user interfaces, accessed via the internet, that may be used to present large amounts of information.

BRIEF DESCRIPTION OF THE DRAWINGS

The included drawings are for illustrative purposes and serve only to provide examples of possible structures and operations for the disclosed inventive systems, apparatus, methods and computer program products for optimized data resolution for web components. These drawings in no way limit any changes in form and detail that may be made by one skilled in the art without departing from the spirit and scope of the disclosed implementations.

DETAILED DESCRIPTION

Figure 1:
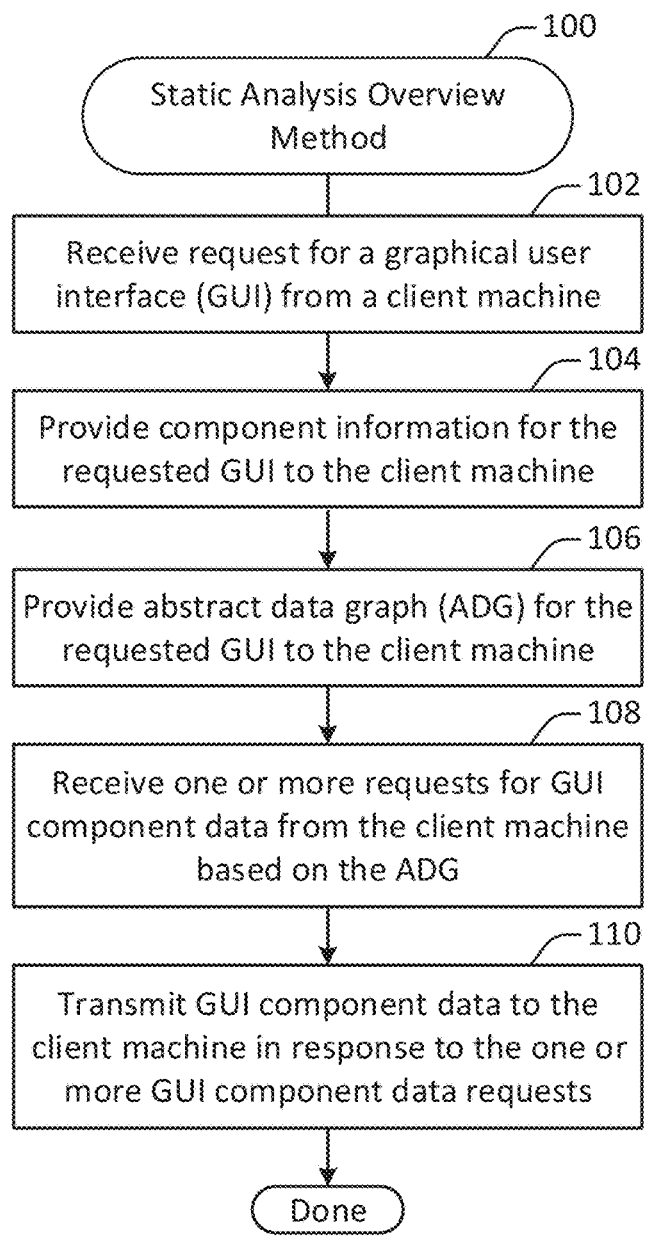
FIG. 1 illustrates a static analysis overview method, performed in accordance with one or more embodiments.

Techniques and mechanisms described herein provide for web components that simplify and streamline the accessing and updating of data in web-based user interfaces. Many user interfaces rely on the web component meta-specification, which itself is a combination of the Custom Elements specification, the shadow Document Object Model (DOM) specification, the Hypertext Markup Language (HTML) Template specification, and the ECMAScript (ES) Module specification. These four specifications combined allow developers to define their own HTML tags (i.e. custom elements) whose styles are encapsulated and isolated (e.g., a shadow DOM), that can be re-stamped many times (template), and have a consistent way of being integrated into applications e.g., the ES module).

Web components often require data from software running on the server, such as records from a datastore. Such data is often dynamically determined. For instance, a user interface may be configured to present information associated with arbitrarily and/or dynamically selected database records. However, if the data needed is not determined until components are rendered, as is done with conventional techniques, then the time involved in retrieving the data may slow down the rendering process. That is, when using conventional techniques, GUI rendering and updating may be subject to lag and delay due to serializing the process of GUI component rendering and data retrieval.

According to various embodiments, techniques and mechanisms described herein provide for discovering data involved in rendering GUI components. In addition, the ways in which data is shared between a set of GUI components may be discovered as well. This discovery process may be performed without requiring the GUI components to be actually loaded in a web browser. In this way, techniques and mechanisms described herein may provide for faster GUI rendering, for faster GUI updating, for improved data fetching speed, for improved data fetching efficiency, and for data priming. Alternatively, or additionally, techniques and mechanisms described herein may provide for the rendering and updating of data-heavy GUI components even when the client machine is offline.

In particular embodiments, static dependency analysis may be performed. Static dependency analysis may involve consuming metadata from the compiler of a GUI component. This approach may leverage information such as JavaScript decorators which are used to declaratively express the data a web component needs. One such decorator is the @wire decorator used by Lightning Web Components, available from Salesforce.com. The compiler metadata provides information such as the data a component depends on, the component hierarchy of the web application, and how the data flows between related components. Static Analysis can be performed on the compiler metadata, to construct the Abstract Data Graph (ADG) describing the data requirements of the GUI components. Which can be used by other processes, such as data resolution, to fetch and prime data caches.

Consider the example of Alexandra, whose job involves using a web application provided via an on-demand computing services environment. The web application is complex, and Alexandra often uses it to access information about a wide variety of data records stored in a database system accessible via the on-demand computing services environment. When using conventional techniques, the complex web application can load slowly, where rendering is often paused while additional information is retrieved from the server. However, when the on-demand computing services environment employs techniques and services described herein, the web application becomes much more responsible, behaving in a manner more similar to a native application. In particular, the system identifies information that the web application is likely to need, in advance of when the components associated with that information are rendered. That information is then retrieved in advance, allowing the relevant components to be rendered quickly using information already available at Alexandra's client machine. This speedup improves Alexandra's efficiency. At the same time, it reduces the number of requests transmitted to, and duplicate data retrieved from, the on-demand computing services environment. These reductions improve the overall performance and reduce the costs of the on-demand computing services environment, which can also be passed on to Alexandra in the form of improved service and reduced on-demand computing services environment prices.

Techniques and mechanisms described here may be described with respect to a user interface rendered in a web browser. However, the techniques and mechanisms are generally applicable to a wide range of user interfaces, such as for example native applications implemented in operating systems such as Android, iOS, OSX, Linux, and Windows.

According to various embodiments, techniques and mechanisms described herein may be used to facilitate progressive page rendering. Progressive page rendering involves linking the resolution of an abstract data graph with the presentation of a "page," which can be any suitable portion of a user interface. Upon such linking, data for the page can be retrieved when it is needed rather than all at once. For instance, a portion of a user interface may not be displayed until and unless a user selects a "tabbed page" affordance in the user interface. In such a configuration, data for rendering such user interface items may be retrieved when the affordance is selected, which may avoid unnecessarily retrieving data that may not ultimately be used to present user interface components that are actually displayed on the display screen.

In some implementations, progressive page rendering may involve wrapping one or more sections of a given user interface in a progressive container, which is a web component configured for progressive page rendering. The progressive container may include, for instance, a special purpose decorator and a unique ID. Then, statically analyzable data dependencies 'under' this component are associated with the region of the page established by instantiating the progressive container.

In some embodiments, a progressive container can deliver a correlation between an abstract data graph and the actually rendered page. In addition, the progressive container can provide deeper information, for instance by leveraging other APIs. In this way, the data resolution layer may determine whether or not a given target component will actually present on the screen.

According to various embodiments, establishing a linkage between one or more components with an abstract data graph as well as the screen visibility of those components may allow the abstract data graph resolver to make decisions about abstract data graph resolution based on that screen visibility. For example, a connected data resolver acting on the abstract data graph can decide whether to retrieve (e.g., pre-fetch) data for a given portion of a user interface based on its presence on or absence from the visible screen of an end-user. Such a decision can provide the basis for a performance optimization, by avoiding the expenditure of system time retrieving data which a user does not need to look at. Then, the actual retrieval of this data can be deferred to a later point in time, such as when the user interface portion is selected for rendering and presentation on the display screen.

According to various embodiments, progressive page rendering provides the ability to decide when and whether to render a component. Such a decision may be influenced by the state of the abstract data graph resolver. For example, depending on one or more configuration parameters, a page component may be authorized for rendering immediately, when the resolver has started resolving its data dependencies, or when its data dependencies have fully resolved. Such configuration parameters may be specified by default, or may be configured by, for instance, a graphical user interface component developer. Such an approach may provide for a smoother and more consistent page load experience for an end user.

In some implementations, a machine learning approach may be employed to determine improved configuration parameters over time. For example, if it is determined that the rendering of a particular web component is often delayed due to data unavailability, a configuration parameter for that web component may be altered to pre-fetch the data associated with the web component. As another example, a page component may be set to render immediately, when the resolver has started resolving its data dependencies, when the resolver has resolved a designated percentage or number of its data dependencies, or when the resolver has fully resolved its data dependencies, based on the observed rendering performance of the web component over time.

In some implementations, techniques and mechanisms described herein, such as progressive page rendering, may provide for graphical user interface portability across different contexts. For instance, progressive data resolution may be employed in a desktop computing environment, while immediate data resolution may be employed in a mobile environment in which a mobile computing device may be likely to experience intermittent connectivity.

In some embodiments, techniques and mechanisms described herein, such as progressive page rendering, may provide greater configurability. For example, the rendering of a user interface component may be configured to meet the needs of a particular graphical user interface. As another example, the portions of a user interface being actively viewed by a user can only be known at runtime. Progressive page rendering may therefore allow the rendering of the graphical user interface to vary based on user input received after the user has already started viewing the graphical user interface.

According to various embodiments, techniques and mechanisms described herein, such as progressive page rendering, may provide for improved performance. For example, screen jitter may be reduced. As another example, data for components being presented on the screen may be prioritized, while data for components off-screen may be deferred, thus resulting in faster load times.

Figure 2:
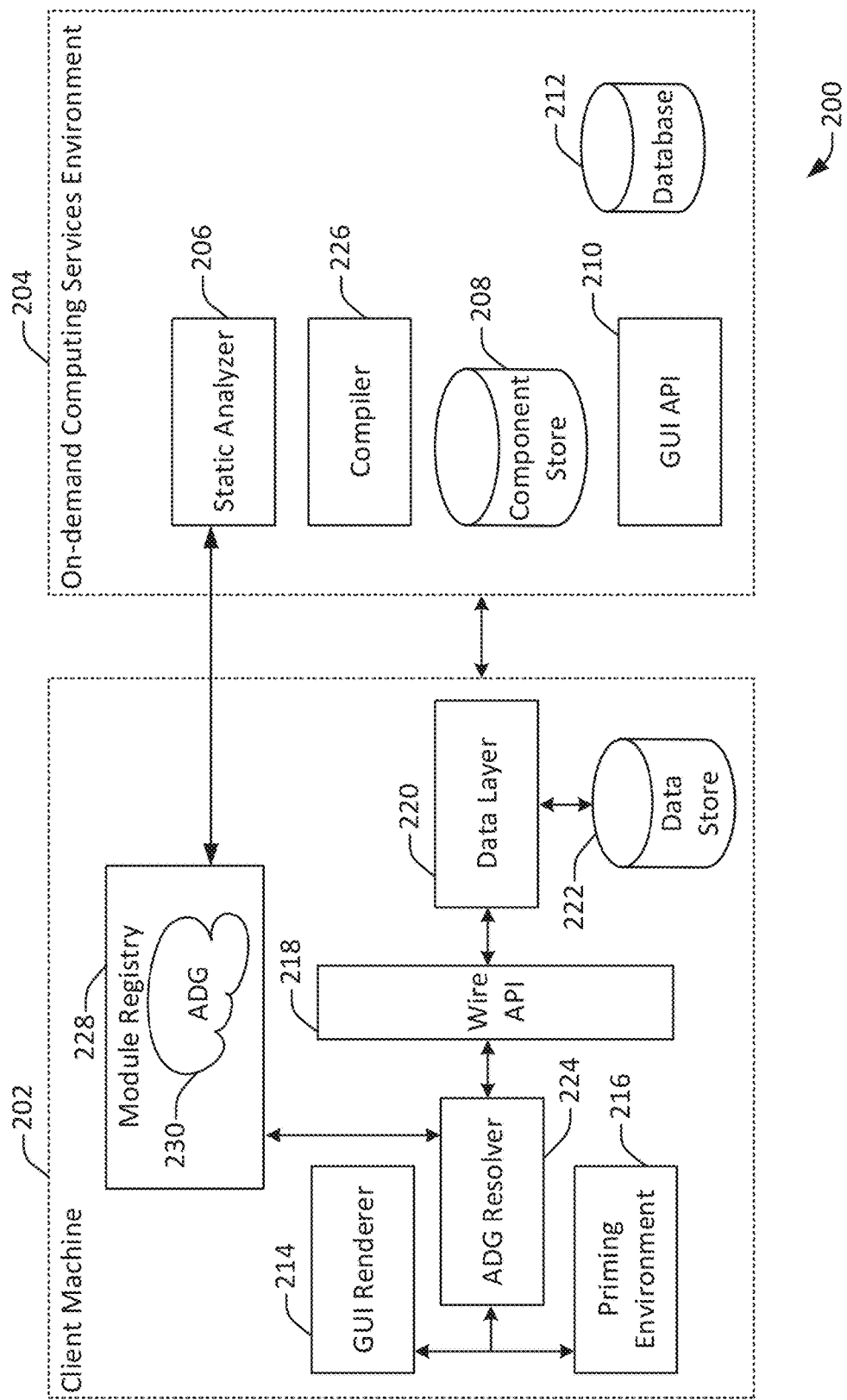
FIG. 2 illustrates a diagram of a system, configured in accordance with one or more embodiments.

FIG. 1 illustrates a static analysis overview method 90, performed in accordance with one or more embodiments. The method 90 may be performed at one or more computing devices located within an on-demand computing services environment. An example of a system that may perform the method 90 is shown in FIG. 2.

A request for a graphical user interface is received from a client machine at 92. According to various embodiments, the request may be generated by any suitable application at the client machine. For example, a web browser at the client machine may load a webpage associated with the graphical user interface. As another example, a native application at the client machine may transmit a request for the graphical user interface.

Component information for the requested graphical user interface is provided at 94. According to various embodiments, responding to the request for the graphical user interface may involve retrieving component definition information for components included in the requested graphical user interface. The component definition information may then be used by a compiler to compile the requested graphical user interface. Information for rendering the graphical user interface at the client machine may then be transmitted to the client machine. Such information may include, but is not limited to: data retrieved from a database system, Hypertext Markup Language (HTML) markup, Javascript instructions, Cascading Style Sheet (CSS) information, image data, and sound data.

An abstract data graph is provided for the requested graphical user interface at 96. According to various embodiments, an abstract data graph may be generated at the server. For instance, the abstract data graph may be generated as part of the process of compiling the component definitions to respond to the request for the graphical user interface received at 92.

One or more requests for graphical user interface component data are received at 98. Such requests may be generated based on the abstract data graph. For instance, while the client machine renders the graphical user interface, the client machine may send one or more requests to the on-demand computing services environment for additional data used to continue to render and/or update the graphical user interface at the client machine.

Graphical user interface component data is transmitted at 110 in response to the one or more graphical user interface component data requests. The graphical user interface component data may include any information involved in rendering and/or updating the graphical user interface, such as data relating to database objects retrieved from a database system.

FIG. 2 illustrates a diagram of a system 200, configured in accordance with one or more embodiments. The system 200 may perform one or more of the techniques described herein. One or more components shown in the system 200 may be implemented within an on-demand computing services environment.

The system 200 includes a client machine 202. The client machine 202 includes a graphical user interface renderer 214, a priming environment 216, an abstract data graph resolver 224, a module registry 228, an abstract data graph 230, a wire API 218, a data layer 220, and a data store 222.

The system 200 also includes an on-demand computing services environment 204. The on-demand computing services environment 204 includes a static analyzer 206, a component store 208, a graphical user interface application procedure interface (API) 210, a database 212, and a compiler 226.

According to various embodiments, the client machine 202 may transmit a request for a graphical user interface to the on-demand computing services environment 204. For instance, the client machine 202 may transmit the request to the graphical user interface API 210.

In some implementations, to respond to this request, the compiler 226 may retrieve component information from the component store 208. The compiler may output metadata for each graphical user interface component included in the requested graphical user interface. The metadata output by the compiler for a graphical user interface component may be referred to as the "module definition" or "ModuleDef".

In some implementations, the module definition defines a web component's identity. For instance, it includes information such as the source code for generating a web component, one or more APIs associated with retrieving information presented within the web component, one or more data dependencies associated with the web component, and/or any relationships between the focal web component and other web component.

Figure 3:
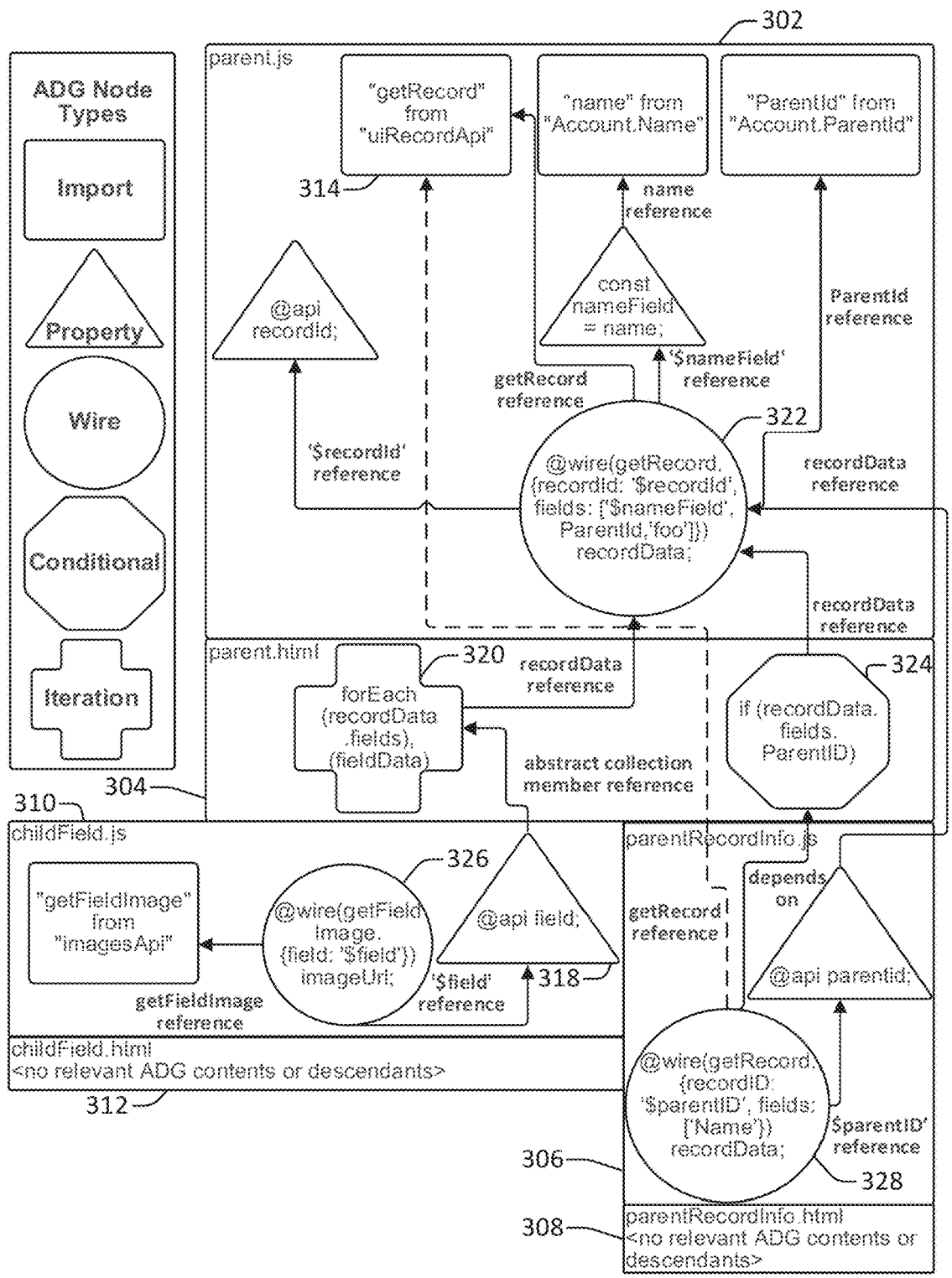
FIG. 3 illustrates an abstract data graph, arranged in accordance with one or more embodiments.

In some embodiments, the static analyzer 206 may analyze information such as module definitions to discover data dependencies and flows between components that are included in a web application. As a result of this analysis, the static analyzer 206 may produce an abstract data graph 230, which may be sent to the client machine 202. An example of an abstract data graph is shown in FIG. 3. Additional information related to the generation of an abstract data graph is discussed with respect to the method 400 shown in FIG. 4. Additional information related to the serialization of an abstract data graph is discussed with respect to the method 500 shown in FIG. 5.

According to various embodiments, the module registry 288 may store information received from the static analyzer 206. Depending on the context, any of a variety of types of information may be received from the static analyzer 206. For instance, the module registry 228 may store the abstract data graph 230, one or more module definitions, and/or any other information related to the construction of the graphical user interface at the client machine.

According to various embodiments, the graphical user interface renderer 214 may start by invoking the @wire decorator for one or more root web components in the requested graphical user interface. Resolving that invocation may involve retrieving information for rendering the root web component. Alternatively, or additionally, the @wire decorator corresponding with one or more child web components of the root web component may be invoked. The invocation of the child web components may be recursive, so that the @wire decorators of the grandchild and great-grandchild web components are also invoked, until all web components nested below the root web component are rendered. The invocation of the @wire decorators and the rendering of the child web components may be recursive since the values that need to be retrieved for the child web components may depend on properties of their parent web components.

When using conventional techniques, each invocation of an @wire decorator would be received directly by the wire API 218. However, such an approach can significantly prolong the rendering process, since the @wire decorator for a child web component may not be invoked until the data is retrieved for its parent web components.

In contrast to the conventional techniques, embodiments of techniques and mechanisms described herein provide for the abstract data graph resolver 224 to substantially speed up this process. The invocation of the @wire for the definition of a root web component may result in the invocation of a rollup module, which may store values for properties of the corresponding root node. The rollup module may store or access the abstract data graph 230 corresponding to the root component. The rollup module may then begin resolving the abstract data graph 230 for the root web component. This resolution process may involve preemptively transmitting @wire requests to the wire API 218. Moreover, the resolution process may involve batching or otherwise aggregating @wire requests. For instance, instead of requesting RecordA.value1 when value1 is needed for rendering, and then later requesting RecordA.value2 when value2 is needed for rendering, the abstract data graph resolver 224 may analyze the graph to determine that both value1 and value2 will eventually be needed, and then request both values at the same time.

According to various embodiments, because the abstract data graph resolver 224 begins resolving the abstract data graph as soon as the @wire for the root web component is invoked, the data retrieval process may be able to effectively get ahead of the requests for data from the graphical user interface renderer 214. Thus, when the graphical user interface render 214 invokes an @wire decorator for a child, grandchild, greatgrandchild, or deeper child web component of the root web component, the data needed to fulfill that request may already be available in the data store 222 because the abstract data graph resolver 224 anticipated that the data eventually would be needed by the graphical user interface renderer 214, and preemptively retrieved that data by sending an @wire request itself. Thus, the abstract data graph resolver 224 acts as a go-between for the graphical user interface renderer 214 and the wire API 218, retrieving the data that the graphical user interface renderer 214 will need in a manner that is preemptive, more efficient, parallelized, and/or involves fewer requests when compared with conventional techniques.

According to various embodiments, the abstract data graph resolver 224 needs to satisfy data dependencies in an efficient manner. For example, the abstract data graph resolver 224 cannot simply pick a node at random in the graph and retrieve the dependencies for that node since the ability to resolve those dependencies may in turn depend on other information that has not yet been retrieved. Instead, the abstract data graph resolver 224 needs to identify which dependencies are ready for retrieval, and which require waiting. Thus, a node in the abstract data graph may be resolved only when the inputs for resolving that node are available.

In particular embodiments, the resolver may also determine the timing for data retrieval. For example, a dependency may be processed as soon as it is ready for retrieval. As another example, the processing of a dependency may be delayed in order to batch requests to improve performance. As yet another example, data dependencies may be fulfilled at different times. For instance, two dependencies requested at the same time may be returned at different times. As discussed herein, the timing for data retrieval may depend on factors such as when dependencies are resolved, whether retrieval requests are aggregated or batched, or other such considerations.

According to various embodiments, the wire API 218 may act as an interface to the data layer 220, which in turn may retrieve information from the on-demand computing services environment 204. For instance, the data layer 220 may communicate with the graphical user interface API 210, which may access the database system 212 to retrieve the requested information. The data layer 220 may store the retrieved information in the data store 222 so that the retrieved information may be provided for use by the graphical user interface renderer 214 upon request.

In some implementations, the priming environment 216 may be used to prime a user interface for offline or partially offline use. For instance, additional requests for data may be generated when it is determined that the graphical user interface is to be generated in a mobile environment in which internet connectivity is likely to be limited.

According to various embodiments, the data layer 220 and/or data store 222 may be configured in a manner that is context-specific. For example, in the web context, the data layer 220 may be implemented as a desktop/laptop app data layer, and the data store 222 may be implemented as an HTTP cache and IndexedDB for storing information inside a web browser. As another example, the mobile context, the data layer 220 may be implemented as a mobile app data layer, and the data store 222 may be implemented as a native smart store associated with a mobile computing device operating system.

FIG. 3 illustrates an abstract data graph 300, arranged in accordance with one or more embodiments. The abstract data graph 300 represents a set of user interface components that may be included in a graphical user interface. For example, the abstract data graph represents the parent.js definition 302, the parent.html definition 304, the parentRecordinfo.js definition 306, the parentRecordInfo.html definition 308, the childField.js definition 310, and the childField.html definition 312.

According to various embodiments, an abstract data graph may include one or more of various types of nodes. The abstract data graph 300 includes a non-exhaustive sample of such nodes.

An example of a wire node is illustrated at 326. According to various embodiments, a wire node represents an @wire statement within a component. It contains a configuration to represent inputs to the @wire statement. For instance, the wire node 326 corresponds with a childField component. The component corresponding to the @wire statement can be instantiated when the wire node 326 is resolved.

According to various embodiments, a configuration input to a wire node may be a literal or a reference to another node in an abstract data graph. For instance, a configuration input may be a property or an import statement.

An example of an import node is illustrated at 314. The import node 314 represents an import statement in which the getRecord component definition is imported from the uiRecordApi module. In the abstract data graph 300, the resolution of the wire node 328 depends on the resolution of the import node 314.

In particular embodiments, a given import statement may be represented by a unique import node in a graph. For instance, if the import statement represented by the import node 314 were to appear elsewhere in the graphical user interface corresponding to the abstract data graph 300, then the dependency could be represented by an additional link to the import node 314 rather than by generating an additional import node. For instance, the import node 314 exhibits two dependency links in the abstract data graph 300.

An example of a property node is illustrated at 318. The property node 318 represents an identifier for the wire represented by the wire node 326. In the abstract data graph 300, the resolution of the wire node 326 depends on the resolution of the property node 318, since the identifier represented by the property node 318 is needed to instantiate the component represented by the childField.js component definition 310.

In particular embodiments, a property node may include a reference to another node. For instance, the property node 318 depends on the iteration node 320, since the iteration node 320 returns the identifier needed to resolve the property node 318.

An example of an iteration node is shown at 320. According to various embodiments, an iteration node may represent an iteration statement, such as a for or while loop, found in a component. The input of an iteration node may be linked to a providing abstract data graph node (e.g., a property node or a wire node). For instance, the input of the iteration node 320 is linked to the wire node 322.

An example of a conditional node is shown at 324. According to various embodiments, the conditional node represents a conditional statement (e.g., an "if" statement) in a component definition. The input of a conditional statement may be linked to a providing abstract data graph node. For instance, the conditional statement 324 depends on the wire node 322. Similarly, the wire node 328 depends on the conditional node 324, and is not rendered unless the condition is true.

Figure 4:
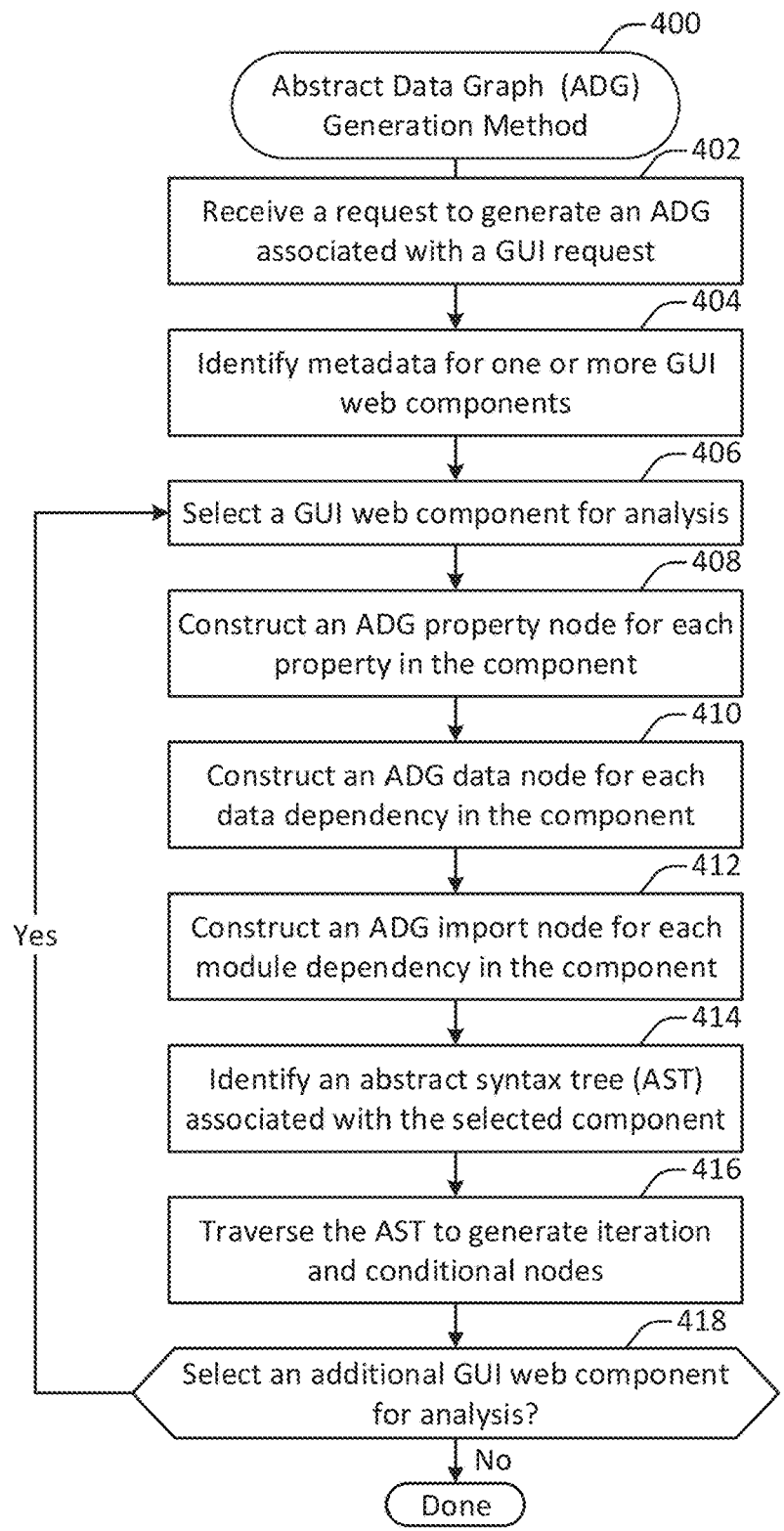
FIG. 4 illustrates a method for generating an abstract data graph, performed in accordance with one or more embodiments.

FIG. 4 illustrates a method 400 for generating an abstract data graph, performed in accordance with one or more embodiments. The method 400 may be performed at one or more computing devices within an on-demand computing services environment. For instance, the method 400 may be performed when a request for a graphical user interface is received from a client machine, as discussed with respect to the method 90 shown in FIG. 1.

A request to generate an abstract data graph associated with a graphical user interface request is received at 402. According to various embodiments, the request may be generated automatically as part of a procedure for generating a graphical user interface in response to the request received from the client machine.

Metadata for one or more graphical user interface components is identified at 404. In some implementations, the metadata may include module definition information output by a compiler. For instance, the module definition information may be output by the compiler 226 shown in FIG. 2.

A graphical user interface web component is selected for analysis at 406. In some implementations, static analysis starts by analyzing the module definition of the top-level component or components in the web application. In some implementations, selecting a graphical user interface web component for analysis may involve creating a node corresponding with the graphical user interface web component in the abstract data graph. The node corresponding with the graphical user interface web component may then be linked with other nodes within the abstract data graph, such as child and/or parent nodes.

In particular embodiments, a given abstract data graph may be limited to a single root component. However, a web application may include multiple root components and hence multiple abstract data graphs. For instance, each page within a web application may be treated as a root component, and hence an abstract data graph can be constructed for each page. Therefore, although the method 400 shown in FIG. 4, and other portions of the description, are described as generating a single abstract data graph, in some configurations and contexts more than one abstract data graph may be generated, serialized, sent to the client machine, and/or used to retrieve component information for rendering and/or updating the web application at the client machine.

An abstract data graph property node is constructed for each property at 408. According to various embodiments, the module definition may be used to identify properties defined in association with the selected component. Then, each property included in the module definition may be used to create an abstract data graph property node that is linked to the selected graphical user interface web component. Property nodes of abstract data graph root nodes may be marked as root property nodes in the abstract data graph.

An abstract data graph data node is constructed at 410 for each data dependency. Data dependencies may be identified by analyzing the module definition. Each abstract data graph data node may describe a piece of data required by the selected graphical user interface web component. Alternatively, or additionally, an abstract data graph data node may describe configuration information associated with the data. Configuration information for a data node may reference the component's properties, static values, data imported from another module, output of another data node, or any other relevant information for configuring the data dependency.

At 412, an abstract data graph import node is constructed for each module dependency in the component. According to various embodiments, the component may depend on information drawn from one or more external modules in order to function. For example, a data node corresponding to a getTemplate instruction may need a template from another module, such as a Details or Highlights module. When such a dependency is detected, an import node may be constructed to reflect the dependency.

An abstract syntax tree (AST) associated with the selected component is identified at 414. In some implementations, an abstract syntax tree may be generated by the compiler from the selected component's HTML template. The abstract syntax tree contains representation of dependencies between graphical user interface components, such as the markup of the selected component including tags for other graphical user interface components. Within those tags, attributes are specified which are used to pass data into the API properties of the child components. The abstract syntax tree also contains information about the conditional statements, iterations, and slots utilized within the components markup.

The abstract syntax tree is traversed at 416 to generate iteration and conditional nodes. Traversing the abstract syntax tree may involve executing any suitable traversal procedure, such as a depth first search starting with the root node. For each node traversed, the static analysis retrieves compiler metadata for each child component so that it can analyze each child and create one or more abstract data graph nodes based on the makeup and data dependencies of the children. For example, property nodes may be created for the child's API properties, and those property nodes linked to data contained within the root component based on the attributes specified on the child tags, within the root component's markup. As another example, the child's metadata may be used to discover data dependencies within the child component, and abstract data graph data nodes may be created to capture those dependencies.

A determination is made at 418 as to whether to select an additional graphical user interface web component for analysis. Additional graphical user interface web components may continue to be selected so long as there remain graphical user interface web components that have not been analyzed. For example, child graphical user interface web components may be selected for analysis in a recursive fashion, for instance as part of a depth-first or breadth-first traversal of the module definition information.

In some implementations, after the abstract data graph is generated, the abstract data graph may be serialized before being sent to the client machine. Additional details regarding abstract data graph serialization are discussed with respect to the method 500 shown in FIG. 5.

According to various embodiments, one or more of the operations shown in FIG. 4 may be performed in an order different than that shown. Alternatively, or additionally, one or more operations may be performed in parallel.

Figure 5:
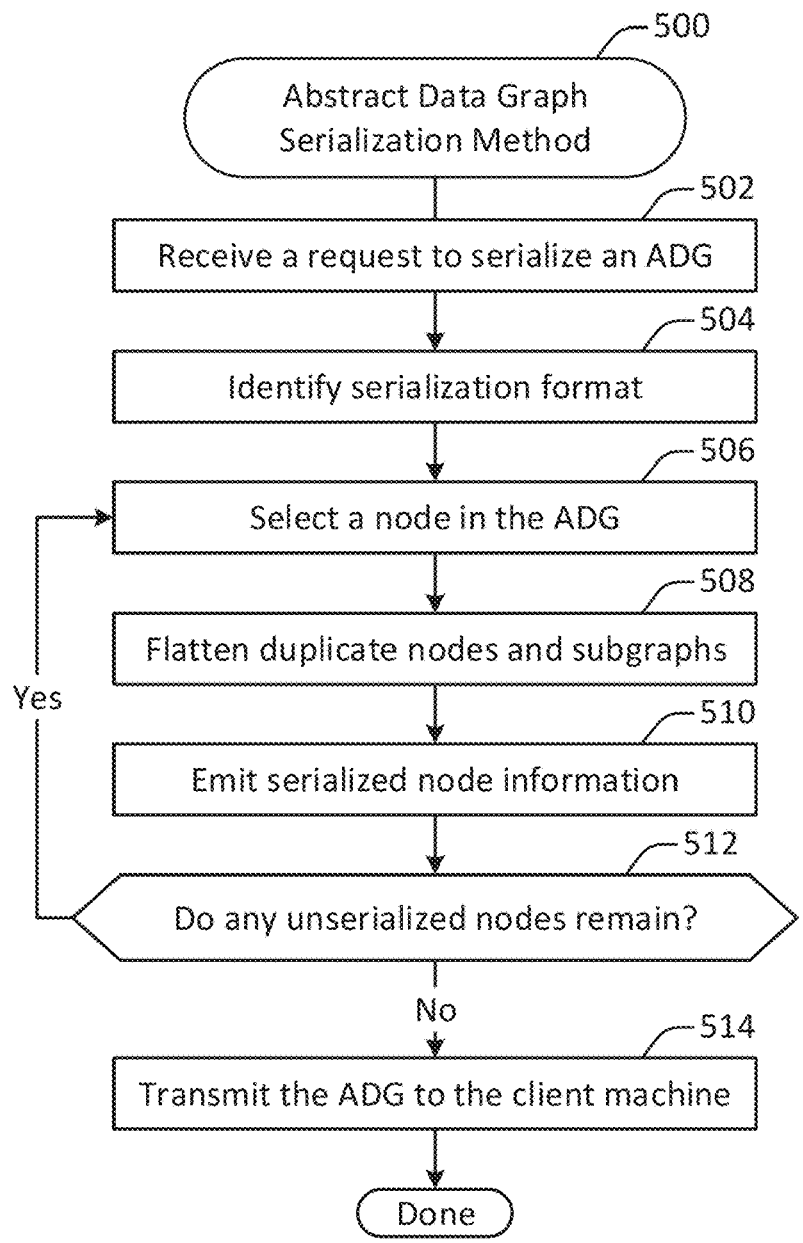
FIG. 5 illustrates a method for serializing an abstract data graph, performed in accordance with one or more embodiments.

FIG. 5 illustrates a method 500 for serializing an abstract data graph, performed in accordance with one or more embodiments. The method 500 may be performed by one or more components within an on-demand computing services environment. For instance, the method 500 may be performed by the static analyzer 206 in the system 200 shown in FIG. 2. The method 500 may be performed in order to serialize an abstract data graph for transmission to the client machine.

A request to serialize an abstract data graph is received at 502. In some implementations, the request may be generated automatically when an abstract data graph is generated in response to a request for a graphical user interface received from a client machine. For instance, the completion of the method 400 shown in FIG. 5 may result in the automatic generate of a request to serialize the generated abstract data graph for transmission to the client machine.

The serialization format is identified at 504. According to various embodiments, any of a variety of suitable serialization formats may be used. For instance, a serialization format such as JavaScript Object Notation (JSON) or a generated JavaScript module may be used. In some configurations, a standard serialization format may be employed for all requests.

In particular embodiments, the serialization format may be identified based on the context, such as the nature of the client machine and/or the graphical user interface request. Different formats may provide different advantages. For example, JSON serialization may be more portable, more human readable, and/or preferable for mobile offline use. As another example, a generated JavaScript module may be better for use in the web browser.

A node in the abstract data graph is selected at 506. According to various embodiments, the procedure may start by selecting root-level nodes. Then, child nodes may be selected for analysis in a recursive process. The recursive process may function as a depth-first or breadth-first traversal of a tree or forest data structure.

Duplicate nodes and subgraphs are flattened at 508. In some implementations, flattening duplicate nodes and subgraphs may involve eliminating or reducing duplication in the abstract data graph generated by the compiler. For instance, if the same component appears at different places within a graphical user interface, the same module definition may appear more than once within the abstract data graph. To reduce the size of the abstract data graph, such duplicate entries may be replaced by references to module definition information already present within the abstract data graph.

Serialized node information is emitted at 510. According to various embodiments, the serialized node information may be a list of attributes, attribute values, child nodes, and other such information associated with the abstract data graph node being analyzed. Such information may be emitted in a format consistent with the format identified at operation 504.

A determination is made at 512 as to whether any unserialized nodes are remain. As discussed with respect to the operation 506, nodes may be selected successively according to a graph traversal procedure such as a depth-first or breadth-first traversal until all nodes have been serialized. When it is determined that no unserialized nodes remain, the abstract data graph is transmitted to the client machine at 514.

Figure 6:
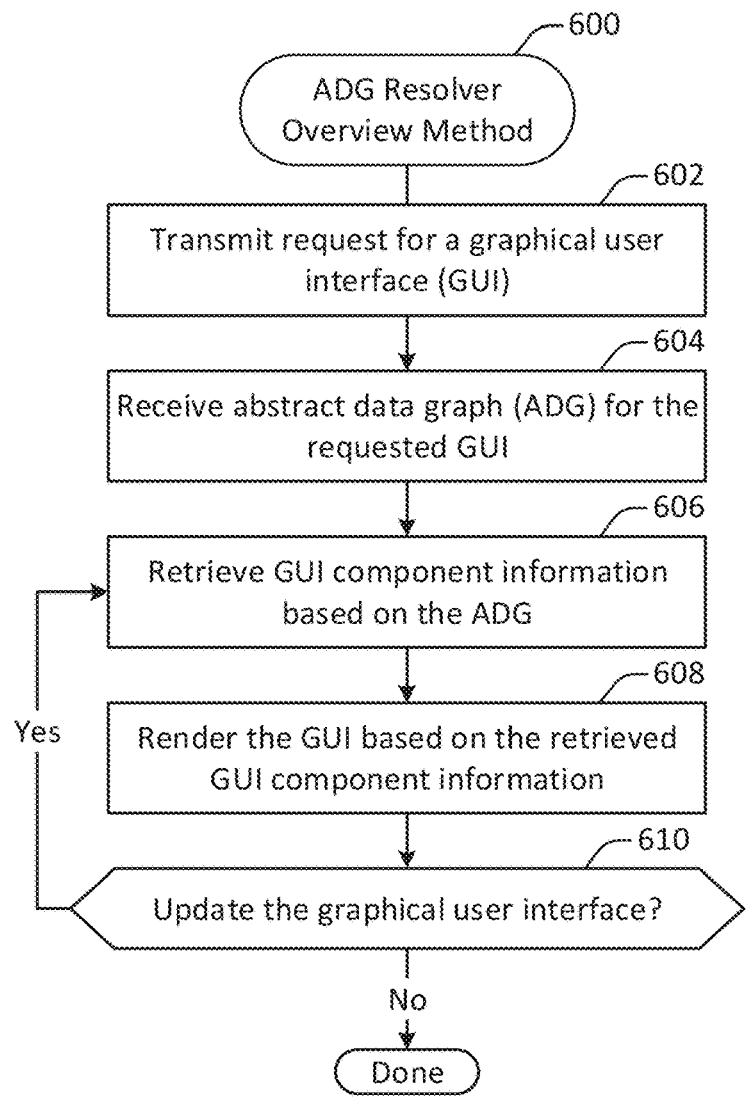
FIG. 6 illustrates an abstract data graph resolver overview method, performed in accordance with one or more embodiments.

FIG. 6 illustrates an abstract data graph resolver overview method 600, performed in accordance with one or more embodiments. The method 600 may be performed at a client machine, such as a desktop computer, a laptop computer, or a mobile computing device.

A request for a graphical user interface is transmitted at 602. According to various embodiments, the request may be transmitted to a server, such as a server associated with an on-demand computing services environment. The request may be generated by any suitable application at the client machine. For example, a web browser at the client machine may load a webpage associated with the graphical user interface. As another example, a native application at the client machine may transmit a request for the graphical user interface.

An abstract data graph for the requested graphical user interface is received at 604. In some embodiments, the abstract data graph may be generated and serialized as discussed with respect to the methods 400 and 500 shown in FIGS. 4 and 5.

At 606, graphical user interface component information is retrieved based on the abstract data graph. According to various embodiments, the graphical user interface component information may include any information for rendering the graphical user interface at the client machine. Such information may include, but is not limited to: data retrieved from a database system, Hypertext Markup Language (HTML) markup, Javascript instructions, Cascading Style Sheet (CSS) information, image data, and sound data.

The graphical user interface is rendered at 608 based on the retrieved graphical user interface component information. According to various embodiments, the graphical user interface may be rendered in a web browser or a native application, depending on the context.

A determination is made at 610 as to whether to update the graphical user interface. In some implementations, the graphical user interface may be updated based on user input. For instance, the graphical user interface may be updated when a user clicks on a button, provides text information, or performs other such user input operations. If the graphical user interface is to be updated, then additional graphical user interface component information may be retrieved at 606 based on the abstract data graph.

Figure 7:
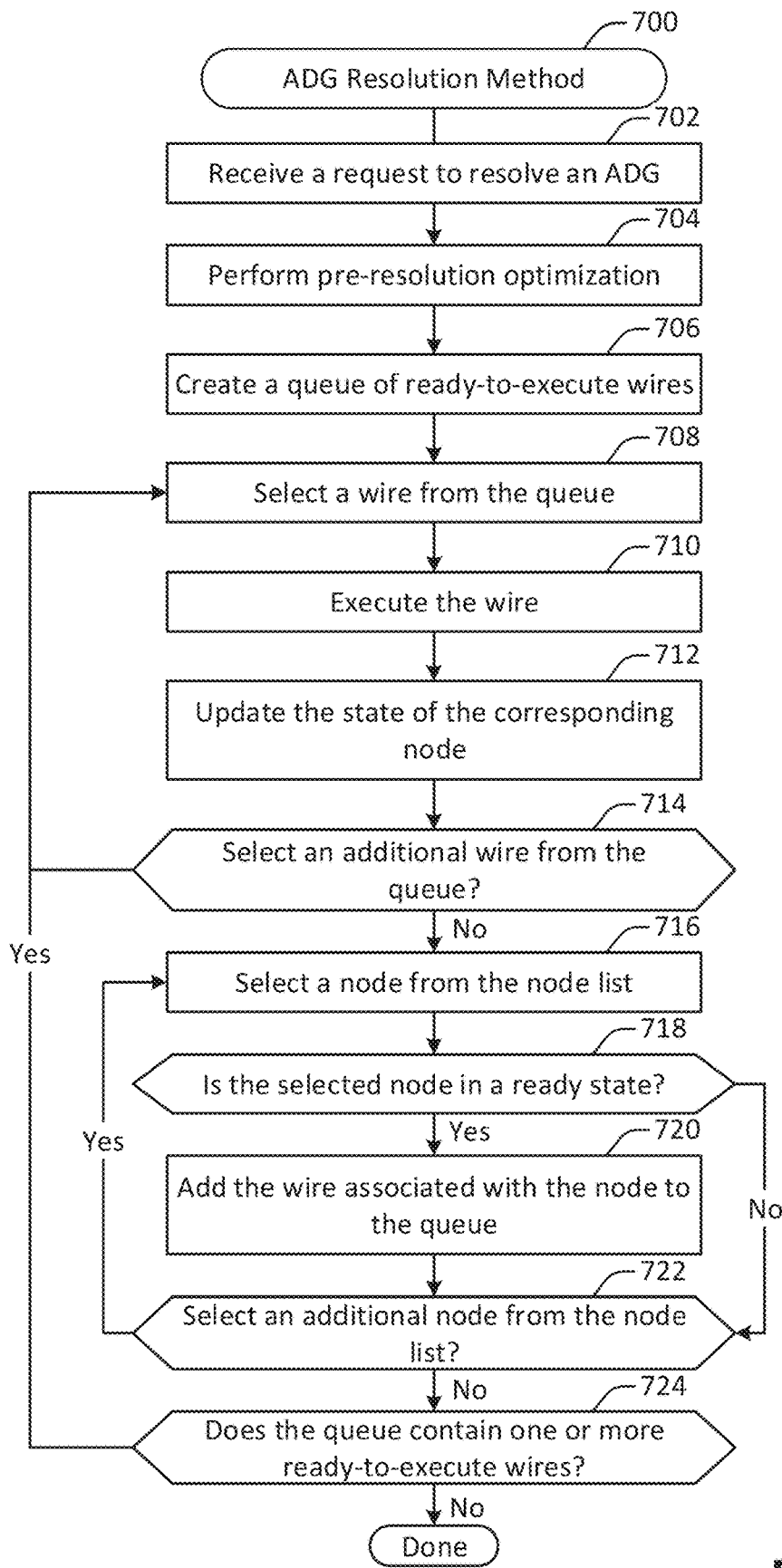
FIG. 7 illustrates an abstract data graph resolution method, performed in accordance with one or more embodiments.

FIG. 7 illustrates an abstract data graph resolution method 700, performed in accordance with one or more embodiments. In some implementations, the method 700 may be performed by an abstract data graph resolver, such as the resolver 224 shown in FIG. 2.

A request to resolve an abstract data graph is received at 702. According to various embodiments, the request may be generated after the abstract data graph is received from the server. At that point, the rendering of the web application may begin. At the same time, the abstract data graph associated with the web application may be resolved to begin fetching the data required to fully render the web application.

Pre-resolution optimization is optionally performed at operation 704. One or more optimizations may be performed before, during, or after operations shown in the method 700. For the purpose of exposition, examples of such optimizations are discussed below, after the rest of the operations performed in the method 700 are described.

A queue of ready-to-execute wires is created at 706. According to various embodiments, a wire is a mechanism for fulfilling a designated dependency. However, the wire may itself be dependent on other conditions, such as the availability of data at the client machine. The wire is ready to execute to fulfill the designated dependency when the wire's own dependencies have already been fulfilled. The resolver maintains a queue of ready-to-execute wires, separate from the nodes in the graph that represent the dependency in the state.

In particular embodiments, when the abstract data graph resolver is first initialized, data associated with abstract data graph resolution may not yet have been retrieved from the server. Accordingly, the queue of ready-to-execute wires may initially include only those wires that do not have dependencies, or that have dependencies that may be resolved by the initial request for the graphical user interface.

A wire is selected from the queue at 708. According to various embodiments, wires may be selected from the queue in any suitable order. For instance, wires may be selected in a first-in, first-out ordering.

The wire is executed at 710. According to various embodiments, executing the wire may involve transmitting a request to the server to retrieve the information associated with the wire. For instance, the request may be sent to an API at the server.

In some contexts, the request may include information determined based on dependency conditions associated with the wire. For example, executing the wire may involve retrieving one or more fields associated with a database record. However, the identity of the database record may be known only after a dependency associated with the wire is first resolved. Thus, in this example, the request may include the identity of the database record.

According to various embodiments, a wire may be executed either asynchronously or synchronously. Which approach is employed may depend on, for example, the type of the wire.

The state of the corresponding node is updated at 712. Updating the state of the node may involve marking the node as resolved if the wire execution was successful. Alternatively, the node may be marked in an error state if the wire execution was unsuccessful.

A determination is made at 714 as to whether to select an additional wire from the queue. According to various embodiments, additional wires may continue to be selected so long as ready-to-execute wires remain in the queue.

In particular embodiments, for instance in the case of an asynchronous wire execution at 710, the resolver may begin to resolve nodes rather than continue to execute wires. For example, the resolver may call recursively to start the resolution process again with the updated state of the dependency tree. Such an approach may ensure that any dependent nodes of the newly processed node will be checked immediately for ready state within the recursive call and that no waiting is necessary.

When a dependency is fulfilled, the dependency graph may be resolved again to see what new nodes are reachable. Accordingly, when it is determined not to select an additional wire from the queue, then at 716 a node is selected from the node list at 716. According to various embodiments, nodes may be selected from the node list in sequence, in parallel, or in any suitable order.

A determination is made at 718 as to whether the selected node is in a ready state. If the selected node is in a ready state, then the wire associated with the node is added to the queue at 720. In some implementations, after the resolver has worked through the queue of wires, some of them may have had their representative node in the dependency graph marked as resolved or in an error state, due to either a synchronous or asynchronous call. The resolver may therefore check previously unready nodes to determine if they have entered a ready state, for instance due to being dependent on a node that has since been marked as resolved.

A determination is made at 722 as to whether to select an additional node from the node list. According to various embodiments, additional nodes may be selected until all nodes in the node list have been analyzed.

A determination is made at 724 as to whether the queue contains one or more ready-to-execute wires. If the queue contains a ready to execute wire, then a wire may be selected for execution at 708. In some implementations, the resolver may continue to execute the method 700 for as long as the queue contains ready to execute wires. That is, the resolver may not exit until all wires in the wire queue are processed, and all promises have been resolved, ensuring each reachable node has reached its final state.

According to various embodiments, as an alternative to the logical flow shown in FIG. 7, the system may wait for all ready to execute wires before moving on and re-evaluating the tree. Doing may render the process deterministic. However because of the wide variability in the time it may take a wire to execute, many fast or even synchronous wires could be waiting on a long running wire. The particular approach employed may therefore be strategically determined based on, for instance, characteristics of the user interface being rendered.

In particular embodiments, a node may never enters the ready state, or may not enter the ready state after a designated period of time or after some condition or conditions have occurred. Such a situation may result from error or unresolved dependencies. Such a node may be ignored, and the associated branch of the dependency tree may be left unprocessed.

According to various embodiments, operations shown in FIG. 7 may be performed in an order different than that shown. For example, the resolver may resolve more than one abstract data graph concurrently. As another example, two or more operations may be performed recursively and/or in parallel.

In some implementations, static, server-side analysis may involve few or no optimizations. One reason for this is that an abstract data graph may be generated as an accurate representation of the declared data need of web components and their relationship to one another. Another reason is that attempting to optimize before the runtime context is available may inadvertently retrieve information that is unneeded in practice. Relevancy of some portions of the abstract data graph may be known only at runtime. For these reasons, an abstract data graph generated at the server may include redundant or mergeable data nodes. However, if ignored these redundant or mergeable data nodes may lead to a graph resolution process in which identical data is retrieved more than once, in which an excessive number of data request are employed, and/or in which other performance drawbacks are incurred.

In particular embodiments, one or more optimizations may be employed to address such issues. Such optimizations may be implemented in a manner that allows for contextually relevant factors to play a role. For instance, one or more optimizations may be performed pre-resolution. In such a phase, optimization code may identify nodes in the abstract data graph which may be optimized, for example, by establishing pre-resolution and/or post-resolution hooks for relevant nodes. Alternatively, or additionally, the shape of the graph may be manipulated by adding, changing, or removing nodes based on the known context.

In a first example, an optimization may determine if a given web component is actually relevant to the user. For instance, the optimization may determine if the given web component is actually being presented. If it is not being presented, then the optimization may prevent the retrieval of the expressed data needs for that component and its children.

In a second example, duplicate nodes that are known to be contextually relevant may be identified. One example of such a situation may occur when nodes reflect the same data needs and have identical input chains to the root of the graph. Such nodes may be recognized, and the graph manipulated at runtime prior to resolution to prevent multiple retrievals for the same data.

In a third example, nodes that have overlapping needs but that are not entirely duplicates may be identified. One example of such a situation is the getRecord wire, which can take as a parameter a collection of fields that effect the ultimate data retrieval behavior. This collection may be combined into a superset in order to improve data interaction and runtime performance.

As a fourth example, nodes that include data that should be retrieved from alternative sources, such as external APIs, may be identified.

As a fifth example, nodes that can be merged together after additional run-time related relevancy information is known may be identified. Such an approach may help to combine what would otherwise be multiple server requests (e.g., for records A, B, and C) into a single server request (e.g., for records A+B+C).

Figure 8:
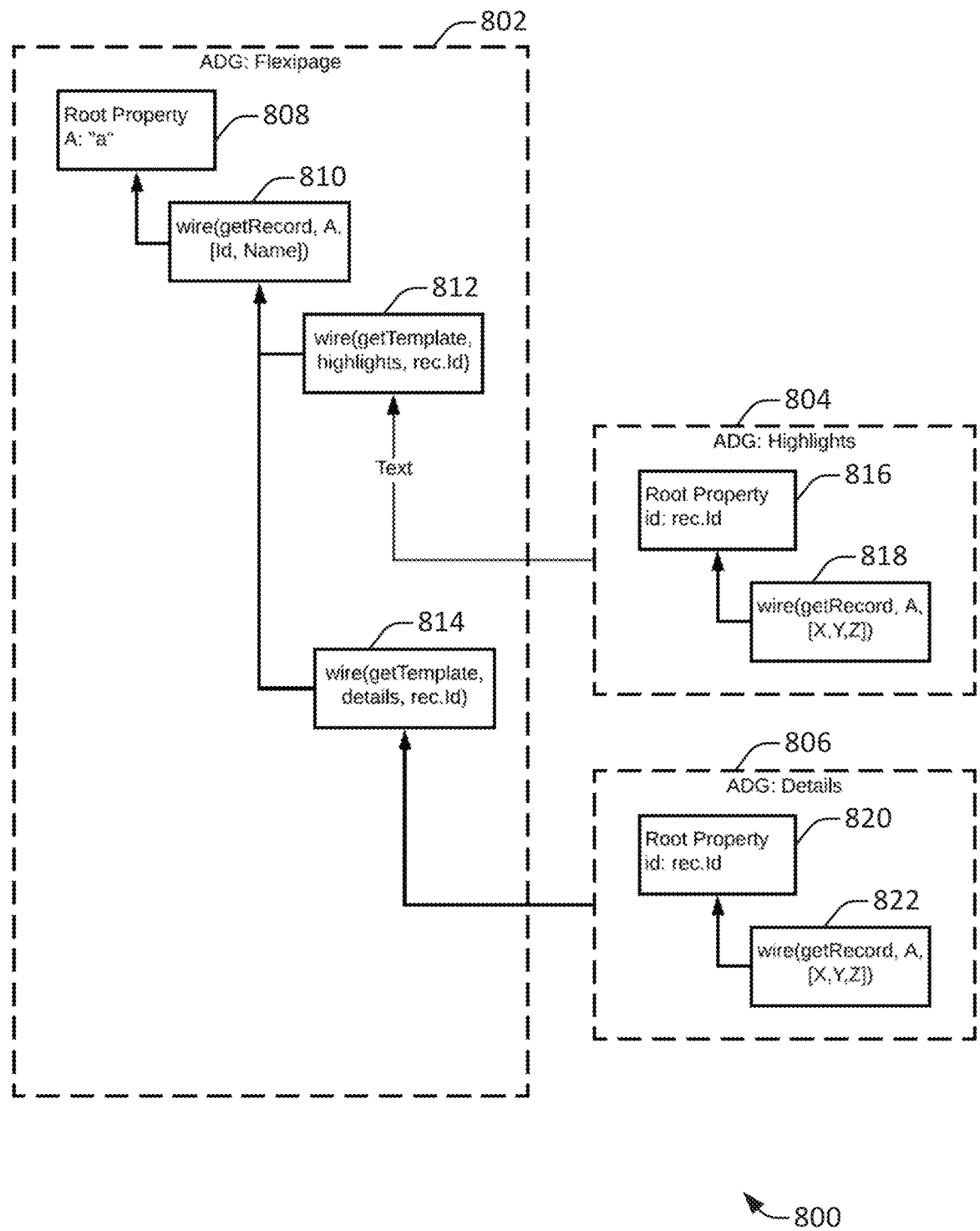
FIG. 8 illustrates a diagram that represents linked abstract data graphs, provided in accordance with one or more embodiments.

FIG. 8 illustrates a diagram 800 that represents linked abstract data graphs, provided in accordance with one or more embodiments. As discussed herein, in some configurations a web application may be associated with more than one abstract data graph. For instance, different pages within the same web application may each be associated with a respective abstract data graph.

The diagram 800 includes a Flexipage abstract data graph 802, a Highlights abstract data graph 804, and a Details abstract data graph 806. These abstract data graphs correspond with Flexipage, Highlights, and Details web components, respectively.

The Flexipage abstract data graph 802 includes a root node 808. The root node 808 is associated with a web component A. The root node 808 is associated with a child node 810, which identifies the retrieval of a record A for rendering the web component A.

The child node 810 in turn includes grandchildren nodes 812 and 814. The grandchild node 812 is a reference to the abstract data graph 804 associated with the Highlights web component, while the grandchild node 814 is a reference to the abstract data graph 806 associated with the Details web component.

The Highlights abstract data graph 804 includes a root node 816, which includes a child node 818 associated with the retrieval of information for rendering the web component corresponding with the root node 816. Similarly, the Details abstract data graph 806 includes a root node 820, which includes a child node 822 associated with the retrieval of information for rendering the web component corresponding with the root node 820.

Thus, the diagram 800 includes an abstract data graph for a Flexipage web component for presenting a database record. The Flexipage web component in turn links to two different abstract data graphs for other web components that present highlights and details about the record that is the subject of the Flexipage web component. Additional details regarding such linkages between abstract data graphs are discussed with respect to the method 900 shown in FIG. 9.

It should be noted that FIG. 8 illustrates simple abstract data graphs for the purpose of illustration. In practice an abstract data graph may be much more complex than those shown in FIG. 8.

Figure 9:
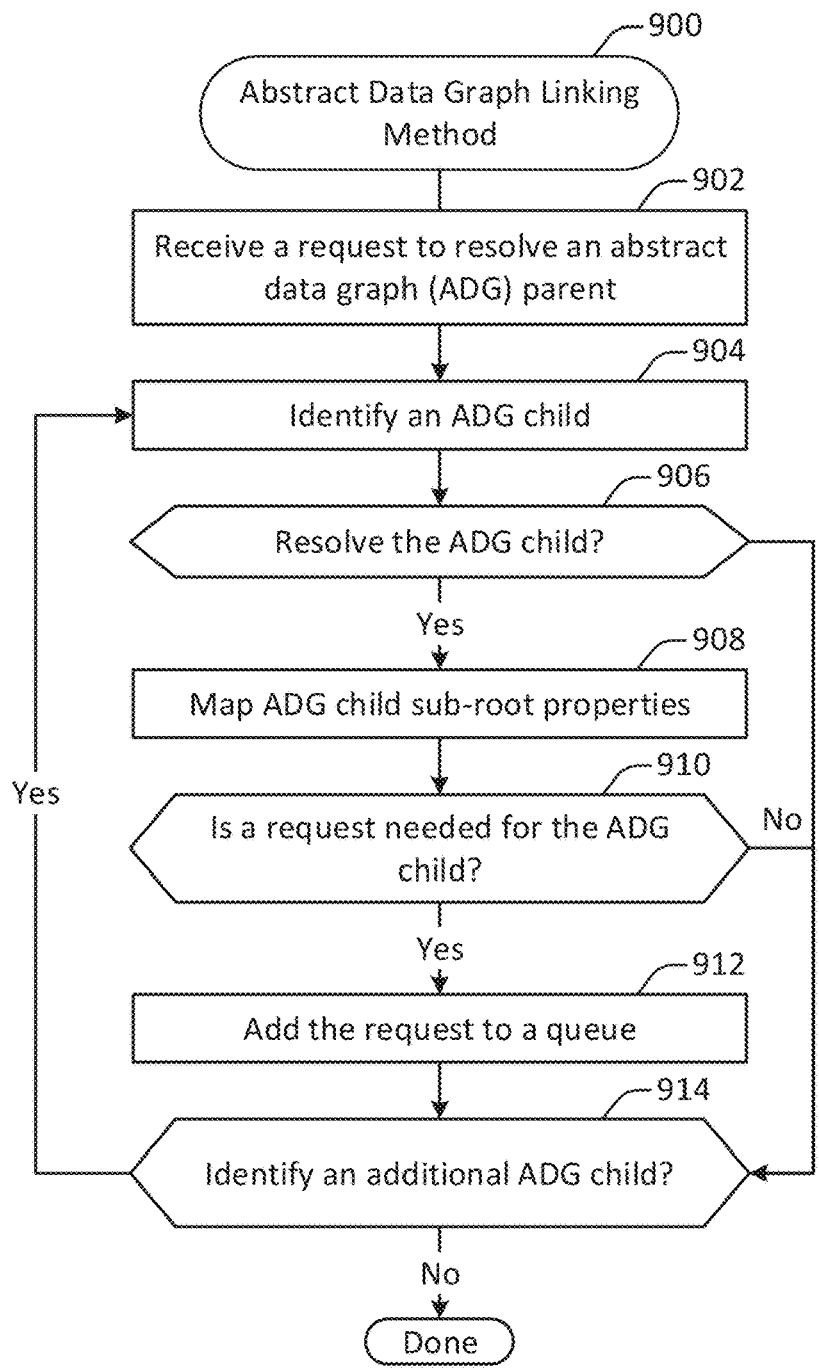
FIG. 9 illustrates a method for abstract data graph linking, performed in accordance with one or more embodiments.

FIG. 9 illustrates a method 900 for abstract data graph linking, performed in accordance with one or more embodiments. The method 900 may be performed at a client machine as part of the resolution of one or more abstract data graphs associated with a web application.

According to various embodiments, the method 900 may be performed in order to address challenges that arise from dynamic rendering of a user interface. In particular, an abstract data graph may describe a single component tree. However, at compile time, the content inside a child component that has been code-split or is generated may be unknown. Thus, in the absence of abstract data graph linking, some requests may be made with only minor additive properties. For instance, first record A may be requested with fields A1 and A2. Then shortly thereafter the same record A may be requested with fields A2 and A3. Accordingly, in order to provide the benefits of abstract data graph resolution, these abstract data graphs may need to be combined at runtime. Then, record A may be retrieved with fields A1, A2, and A3 all at once, to save a request and the round trip communication with the server that the request entails.

A request to resolve an abstract data graph parent is received at 902. In some implementations, the request may be received in conjunction with the method 800 shown in FIG. 7. For instance, a root abstract data graph associated with a web application may be resolved first. The root abstract data graph that is resolved first may be associated with the highest level web component that is displayed initially when the web application is loaded. Then, as part of that resolution, any abstract data graph children may be resolved as shown in FIG. 900.

An abstract data graph child is identified at 904. According to various embodiments, certain wire decorators may return modules or templates. Which wires are associated with child abstract data graphs may be determined based on, for example, retrieving the information from a whitelist. Such wires may consistently return an abstract data graph and a module definition.

A determination is made at 906 as to whether to resolve the abstract data graph child. According to various embodiments, the abstract data graph may be resolvable when one or more conditions are met. For example, the abstract data graph may be resolved when it becomes known at runtime, for instance based on one or more operations that occur during or after the rendering of the web application, such as when the user provides user input that triggers the rendering of a particular web component. As another example, the abstract data graph may be resolved when the root properties of the abstract data graph become known, which allows that data to be passed in for resolution. For instance, in FIG. 8, the abstract data graph 804 associated with the Highlights component cannot be resolved until the rec.ID is known based on the resolution of the Flexipage abstract data graph 802.

If the abstract data graph child is to be resolved, one or more abstract data graph child sub-root properties are mapped at 908. As shown in FIG. 8, a link to a child abstract data graph may be associated with a getTemplate wire, from which root properties are referenced. During merging, these sub-root properties may be assigned as values to the wire's input attributes. The values may then be usable during the resolution of the subtree.

At 910, a determination is made as to whether a request is needed for the abstract data graph child. If a request is needed, then at 912 the request is added to a queue. According to various embodiments, since many abstract data graphs may be resolved concurrently, a global queue of requests can be used. In this way, when requests are ready, they can be optimized together even though they may come from disparate trees. Request batching can make use of this global request queue to reduce the number of requests required to fetch the required data.

A determination is made at 914 as to whether to identify an additional abstract data graph child. According to various embodiments, abstract data graph children may be resolved recursively until all child abstract data graph of the parent abstract data graph have been resolved.

Figure 10:
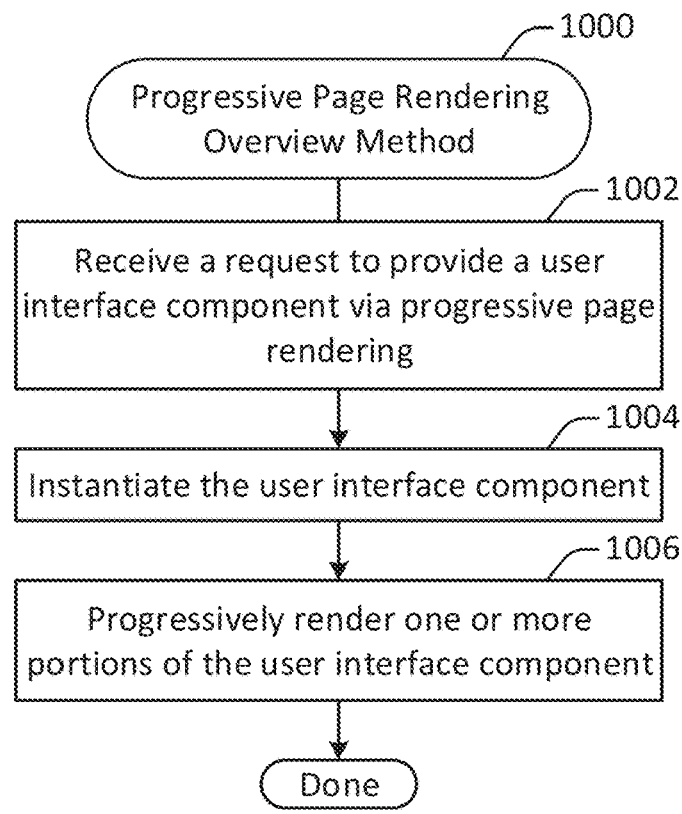
FIG. 10 illustrates a progressive page rendering overview method, performed in accordance with one or more embodiments.

FIG. 10 illustrates a progressive page rendering overview method 1000, performed in accordance with one or more embodiments. In some implementations, the progressive page rendering overview method 1000 may be performed at a client machine in communication with a remote computing system. For instance, the progressive page rendering overview method 1000 may be performed as part of the resolution of an abstract data graph during the rendering of a graphical user interface. As discussed herein, abstract data graph resolution may be performed in parallel with the rendering of the graphical user interface.

A request to provide a user interface component via progressive page rendering is received at 1002. According to various embodiments, the request may be generated as part of the rendering process. For instance, a graphical user interface may include a number of web components, one or more of which may be a progressive page container. Examples of progressive page containers are discussed in additional detail with respect to FIGS. 11-14. The request to provide a user interface component via progressive page rendering may be generated when one of these progressive page containers is identified by the rendering engine.

The user interface component is instantiated at 1004. According to various embodiments, instantiating the user interface component may involve creating an instance of a definition corresponding to the user interface component. In addition, a progressive page @wire decorator corresponding with the user interface component may be invoked.

According to various embodiments, an @wire may be a type of decorator on a web component, which may be implemented in, for instance, JavaScript. In general, resolving the invocation of an @wire decorator corresponding with a web component may involve retrieving information for rendering the web component. However, whereas that resolution may be triggered immediately for most web components, the resolution of the invocation of an @wire decorator corresponding with a progressive page container web component may be delayed.

One or more portions of the user interface component are progressively rendered at 1006. When a user interface component is progressively rendered, its rendering may be delayed based on one or more considerations. For example, its rendering may be delayed until an event is detected, such as a user clicking on a link withing a graphical user interface. Additional details regarding a procedure for progressively rendering a page component are discussed in additional detail with respect to the method 1400 shown in FIG. 14.

Figure 11:
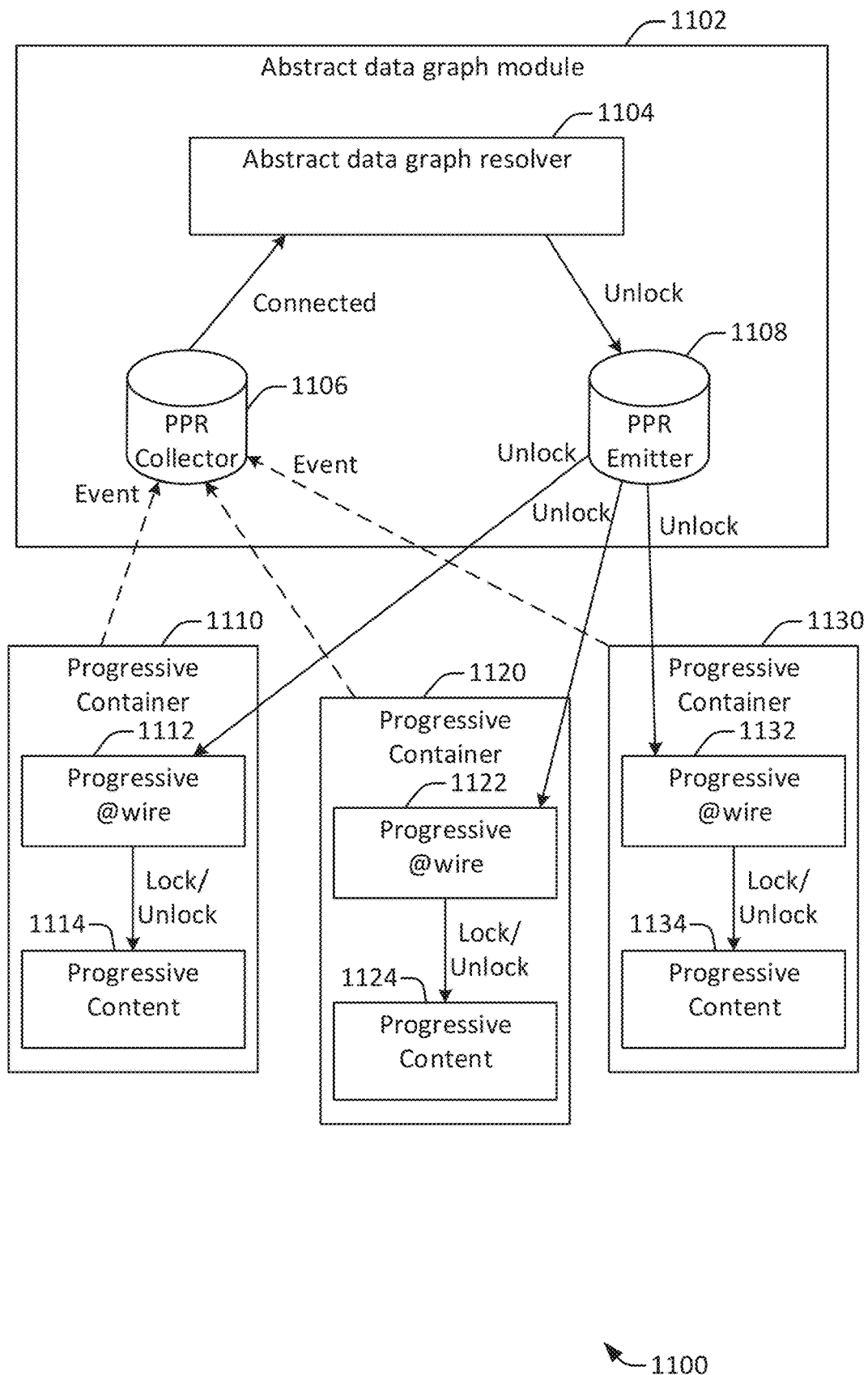
FIG. 11 illustrates an example of a system flow for progressive page rendering, arranged in accordance with one or more embodiments.

FIG. 11 illustrates an example of a system flow 1100 for progressive page rendering, arranged in accordance with one or more embodiments. The system flow 1100 includes progressive page containers 1110, 1120, and 1130 in communication with an abstract data graph module 1102. The abstract data graph module 1102 includes an abstract data graph resolver 1104, a progressive page rendering collector 1106, and a progressive page rendering emitter 1108. The progressive containers include progressive wires 1112, 1122, and 1132 as well as progressive content 1114, 1124, and 1134.

According to various embodiments, a user interface may include various numbers of progressive containers. For the purpose of illustration, the system flow 1100 shows three such containers, and the flow is described with respect to one of them.

The progressive container 1110 may be instantiated as discussed with respect to the operation 1004 shown in FIG. 10. As discussed, instantiating the progressive container may involve invoking the @wire decorator 1112. According to various embodiments, the @wire decorator may indicate whether the progressive content 1114 is locked or unlocked.

In some implementations, when the progressive content is locked, the data necessary for rendering the progressive content has not yet been retrieved for rendering by the abstract data graph resolver. The state may be changed to unlocked when that data has been retrieved.

In some embodiments, when the progressive container 1110 is instantiated, the progressive content 1114 may initially be set to the locked state. The state of the progressive content 1114 may be changed by the progressive @wire decorator 1112.

According to various embodiments, when an event occurs on the page, a state change message may be transmitted to the progressive page rendering collector 1106. The progressive page rendering collector 1106 may record the state change. In addition, the abstract data graph resolver 1104 may be notified of the event. The nature of the event may vary based on the context. For example, user input indicating that the user has clicked on a graphical user interface affordance may be received. As another example, user input indicating that the user has scrolled down a user interface component may be received. As yet another example, the event may indicate that a particular user interface component has been updated with new information.

According to various embodiments, one type of event may indicate that the progressive container is connected. Another type of event may indicate that the progressive container is visible on the page or is set to be made visible on the page. Such information may be determined based on user input, as noted above. Alternatively, or additionally, such information may be determined based on analyzing a viewpoint associated with the presentation of a graphical user interface. The viewport may indicate a portion of a rendered graphical user interface that is being actively displayed on a display screen.

In some implementations, the abstract data graph resolver 1104 may determine whether to retrieve information associated with the progressive container 1110. The determination may be made at least in part based on the nature of the event. If the event indicates that the progressive container is to be made visible, then one or more portions of the abstract data graph corresponding with the progressive container may be resolved. Resolving the portions of the abstract data graph may involve, for instance, retrieving data from a remote computing system if that data has not yet been retrieved.

In some embodiments, the abstract data graph resolver 1104 may notify the progressive page rendering emitter 1108 when one or more portions of the abstract data graph corresponding with the progressive container 1110 have been resolved. Then, the progressive page rendering emitter may communicate with the progressive @wire 1112 associated with the progressive container 1110. For instance, the progressive page rendering emitter 1108 may transmit an unlock message to the progressive @wire 1112.

According to various embodiments, the progressive page rendering collector 1106 may information the abstract data graph resolver 1104 about one or more criteria for indicating to the progressive page rendering emitter 1108 that the progressive @wire 1112 should be unlocked. For example, an unlock message may be transmitted immediately. As another example, an unlock message may be transmitted when the abstract data graph resolver 1104 has resolved the first node of the relevant portion of the abstract data graph. As yet another example, an unlock message may be transmitted with the abstract data graph resolver 1104 has resolved the last node of the relevant portion of the abstract data graph. As still another example, an unlock message may be associated with a minimum delay and/or a maximum delay.

In particular embodiments, the progressive page rendering emitter 1108 may in certain instances transmit a message to the progressive @wire 1112 instructing the progressive @wire 1112 to lock the progressive content 1114. For instance, an event may be detected that indicates that the progressive container, though already rendered, should be updated without refreshing the entire graphical user interface. In such a configuration, the progressive content 1114 may be locked from use in further rendering. Then, the progressive content 1114 may be updated by the abstract data graph resolver. Finally, the progressive content 1114 may be unlocked, and the progressive container 1110 updated by manipulating the shadow DOM.

Figure 12:
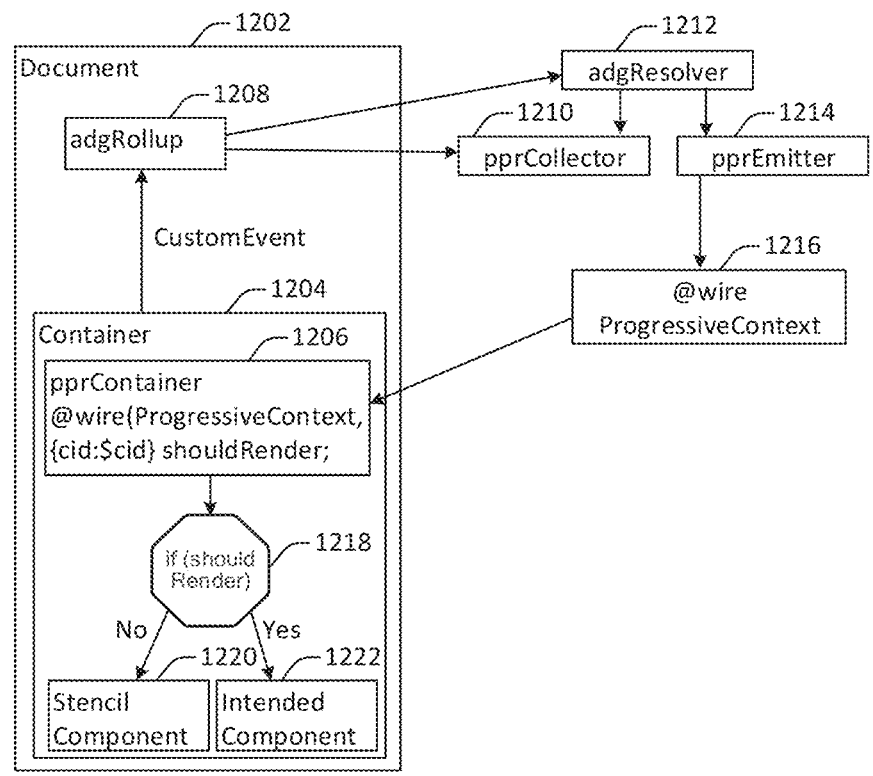
FIG. 12 illustrates an example of a graphical user interface system configured for progressive page rendering, arranged in accordance with one or more embodiments.

FIG. 12 illustrates an example of a graphical user interface system 1200 configured for progressive page rendering, arranged in accordance with one or more embodiments. The graphical user interface system includes a document 1202, which includes an instance of a container 1204. The container instance 1204 includes a progressive page rendering container 1206.

According to various embodiments, a custom event may report a state change associated with the progressive page rendering container 1206 to the abstract data graph rollup module associated with the graphical user interface rendered based on the document 1202. The custom event may indicate, for instance, that the portion of the rendered document corresponding with the progressive page rendering container 1206 needs to be rendered soon.

In some implementations, the abstract data graph rollup module 1208 reports the state change to the progressive page rendering collector module 1210. The abstract data graph rollup module 1208 may also send a request to the abstract data graph resolver 1212 to resolve the portion of the abstract data graph corresponding with the progressive page rendering container 1206.

According to various embodiments, the abstract data graph resolver may resolve the portion of the abstract data graph corresponding with the progressive page rendering container 1206. Also, the abstract data graph resolver may instruct the progressive page rendering emitter 1214 to update the progressive context associated with the progressive page rendering container 1206. As discussed herein, the progressive wire status may be updated before, during, or after the resolution of the abstract data graph portion.

In some implementations, the progressive page rendering emitter may emit progressive context wire value 1216 of true, false, or unknown. The value may be stored as the "shouldRender" value in the progressive page rendering container 1206.

According to various embodiments, the shouldRender value in the progressive page rendering container 1206 may be used to determine at 1218 whether the progressive page rendering container 1206 should be rendered. If the shouldRender value is yes, then the intended component 1222 is rendered. If instead the shouldRender value is no, then a stencil component 1220 may be provided as a stand in. The stencil component 1220 may be, for example, a component outline that lacks one or more data elements associated with a fully rendered component. The shouldRender value for the progressive page rendering container 1206 may be initially set to "no" or "unknown." The value may then be updated by the progressive page rendering emitter 1214.

Figure 13:
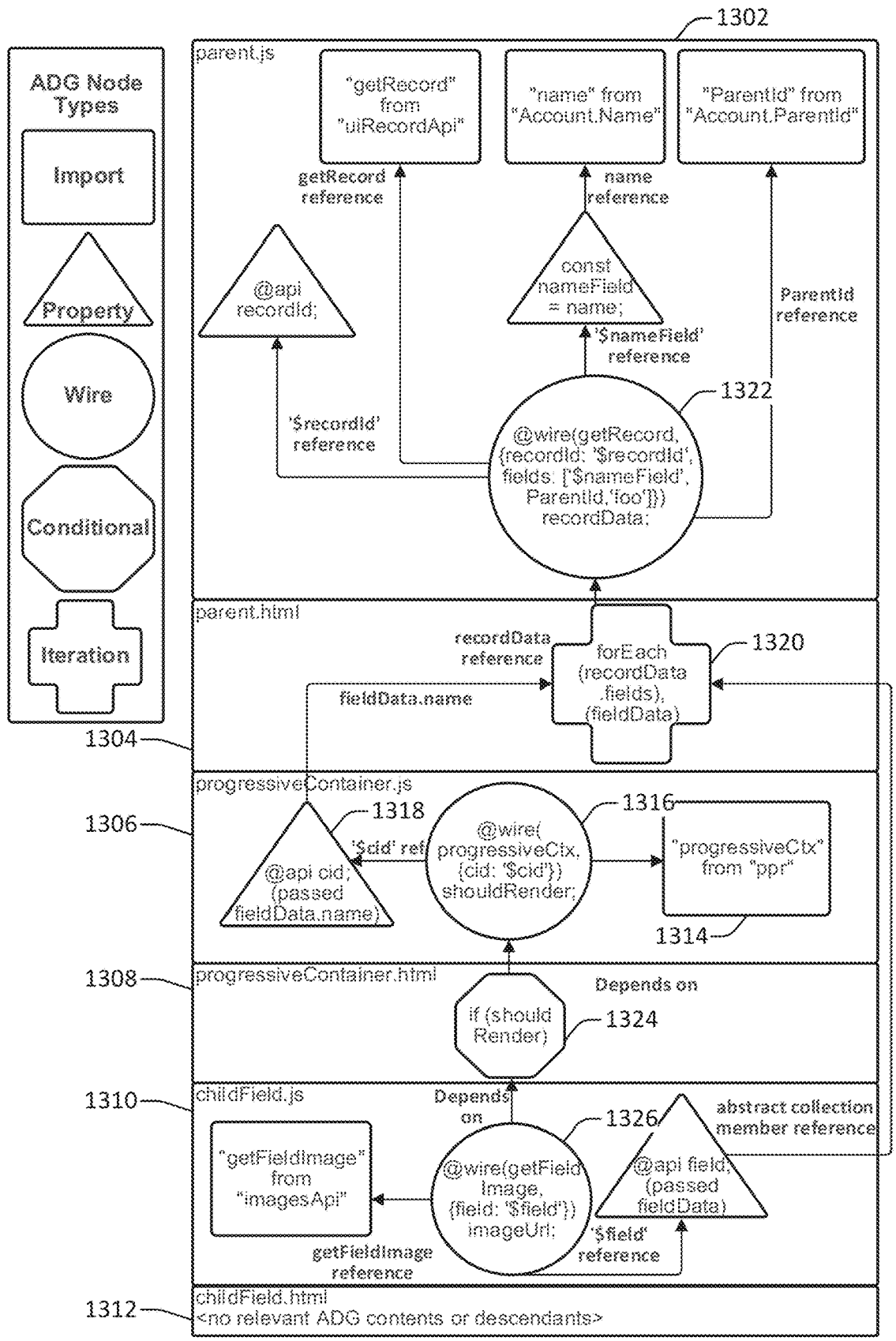
FIG. 13 illustrates an example of an abstract data graph, produced in accordance with one or more embodiments.

FIG. 13 illustrates an abstract data graph 1300, arranged in accordance with one or more embodiments. The abstract data graph 1300 represents a set of user interface components that may be included in a graphical user interface. For example, the abstract data graph represents the parent.js definition 1302, the parent.html definition 1304, the progressiveContainer.js definition 1306, the progressiveContainer.html definition 1308, the childField.js definition 1310, and the childField.html definition 1312.

According to various embodiments, an abstract data graph may include one or more of various types of nodes. The abstract data graph 1300 includes a non-exhaustive sample of such nodes.

An example of a wire node is illustrated at 1316. According to various embodiments, a wire node represents an @wire statement within a component. It contains a configuration to represent inputs to the @wire statement. For instance, the wire node 1316 corresponds with a progressive container component. The component corresponding to the @wire statement can be instantiated when the wire node 1316 is resolved.

According to various embodiments, a configuration input to a wire node may be a literal or a reference to another node in an abstract data graph. For instance, a configuration input may be a property or an import statement.

An example of an import node is illustrated at 1314. The import node 1314 represents an import statement in which the progressiveCTX component definition is imported from the ppr (i.e., progressive page rendering) module. In the abstract data graph 1300, the resolution of the wire node 1316 depends on the resolution of the import node 1314.

In particular embodiments, a given import statement may be represented by a unique import node in a graph. For instance, if the import statement represented by the import node 1314 were to appear elsewhere in the graphical user interface corresponding to the abstract data graph 1300, then the dependency could be represented by an additional link to the import node 1314 rather than by generating an additional import node.

An example of a property node is illustrated at 1318. The property node 1318 represents an identifier for the wire represented by the wire node 1316. In the abstract data graph 1300, the resolution of the wire node 1316 depends on the resolution of the property node 1318, since the identifier represented by the property node 1318 is needed to instantiate the component represented by the progressiveContainer.js definition 1306.

In particular embodiments, a property node may include a reference to another node. For instance, the property node 1318 depends on the iteration node 1320, since the iteration node 1320 returns the identifier needed to resolve the property node 1318.

An example of an iteration node is shown at 1320. According to various embodiments, an iteration node may represent an iteration statement, such as a for or while loop, found in a component. The input of an iteration node may be linked to a providing abstract data graph node (e.g., a property node or a wire node). For instance, the input of the iteration node 1320 is linked to the wire node 1322.

An example of a conditional node is shown at 1324. According to various embodiments, the conditional node represents a conditional statement (e.g., an "if" statement) in a component definition. The input of a conditional statement may be linked to a providing abstract data graph node. For instance, the conditional statement 1324 depends on the wire node 1326.

According to various embodiments, an arrangement of nodes in an abstract data graph may facilitate progressive page rendering. For example, the graphical user interface represented by the abstract data graph 1300 may include N instances of the progressiveContainer.js component definition 1306, the progressiveContainer.html component definition 1308, the childField.js component definition 1310, and the childField.html component definition 1312, depending on the contents of the recordData.fields returned by the iterator represented by the iterator node 1320.

According to various embodiments, a conditional statement may be used to indicate when and under what conditions a progressive container should render. For instance, an instance of the childField.js component definition 1310 and the childField.html component definition 1312 may be rendered when the conditional 1324 returns "true," which may be the case when the data involved in rendering the instance of the child component definition is available.

Figure 14:
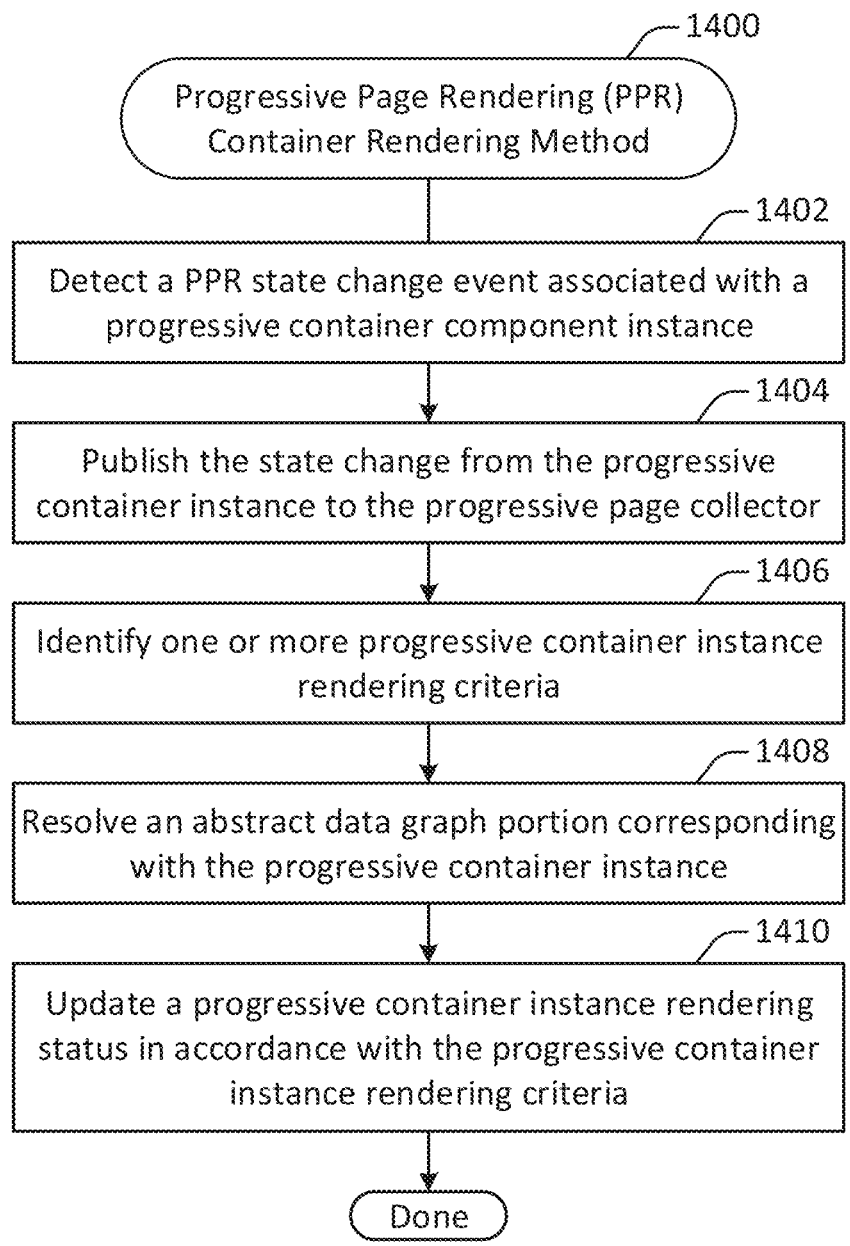
FIG. 14 illustrates a progressive page rendering container rendering method, performed in accordance with one or more embodiments.

FIG. 14 illustrates a progressive page rendering container rendering method 1400, performed in accordance with one or more embodiments. In some implementations, the method 1400 may be performed at a client machine in communication with a remote computing system. For instance, the method 1400 may be performed when an event is detected indicating that the contents of a progressive container should be rendered for presentation in a graphical user interface being displayed on a display screen.

A progressive page rendering state change event associated with a progressive container component instance is detected at 1402. According to various embodiments, the progressive page rendering state change event may be any event configured to cause a state change associated with the progressive component instance. Such a configuration parameter may be set by, for instance, the developer of the web component corresponding with the progressive page container. Examples of such a state change event may include, but are not limited to: the detection of user input associated with the rendered graphical user interface, a determination that a viewport associated with the rendered graphical user interface has changed to include the progressive page container, a determination that a viewport associated with the rendered graphical user interface has changed in a fashion that indicates that the contents progressive page container are likely to be viewed in the future, and/or any other suitable event or combination of events.

The state change is published from the progressive container instance to the progressive page collector at 1404. In some implementations, publishing the state change may involve transmitting a message to the progressive page rendering collector that the progressive container is to be made visible.

One or more progressive container instance rendering criteria are identified at 1406. In some implementations, the rendering criteria may indicate to the progressive container when the container is available for rendering in the graphical user interface.

According to various embodiments, one or more of a variety of rendering criteria may be employed. For example, if the delay is set to "none", then the content assigned to the progressive page container may be rendered initially, such as when the progressive page container is instantiated. As another example, if the delay is set to "immediate", then the progressive page container may be rendered after the state change message is transmitted. As yet another example, if the delay is set to "start-in-flight", then the progressive page container may be rendered after the abstract data graph resolver begins resolving abstract data graph nodes associated with the container. Such a condition may be satisfied before data items associated with the progressive container have been received, and/or before initiating the retrieval of any recursive data sets. As still another example, if the delay is set to "all-in-flight", the progressive page container may be rendered after the abstract data graph resolver begins resolving the last set of unresolved abstract data graph nodes associated with the container. At this point, all nodes in the abstract data graph associated with the container are either fully resolved or are in-flight. As still another example, if the delay is set to "resolved", the progressive page container may be rendered after the abstract data graph resolver has fully resolved all nodes in the abstract data graph associated with the container. At this point, all of the data required for rendering the container's subtree has been received by the client machine. As still another example, a minimum and/or maximum delay (e.g., in milliseconds) may be specified. Such criteria may be applied instead of, or in addition to, any other criteria.

According to various embodiments, as with the state change event discussed with respect to the operation 1402, the progressive container instance rendering criteria may be configured based on the context. For example, a web component application developer may configure one or more rendering criteria.

In particular embodiments, one or more rendering criteria may be determined based on a machine learning procedure. For example, if the rendering of a particular progressive page container tends to be delayed based on the rendering criteria rather than data availability, then the criteria may be adjusted to render the progressive page container more quickly. However, if instead the rendering of a particular progressive page container tends to be delayed based on data availability, then the rendering criteria may be configured so as to increase the rendering delay.

An abstract data graph portion corresponding with the progressive container instance is resolved at 1408. According to various embodiments, resolving the abstract data graph portion may involve retrieving one or more data items from the remote computing system. For instance, resolving the abstract data graph portion may involve performing one or more of the operations shown in the method 700 in FIG. 7.

A progressive container instance rendering status is updated in accordance with the progressive container instance rendering criteria at 1410. In some implementations, updating the progressive container instance rendering status may involve transmitting a message from the progressive page rendering emitter to the progressive page @wire, as discussed with respect to FIG. 11, for example.

According to various embodiments, although operation 1410 is shown in FIG. 14 as being performed after operation 1408, the timing of operation 1410 depends on the rendering criteria identified at 1406. For example, depending on the rendering criteria, the status may be updated before, during, or after the performance of the operation 1402. As another example, depending on the rendering criteria, the status may be updated before, during, or after the performance of the operation 1408.

Figure 15:
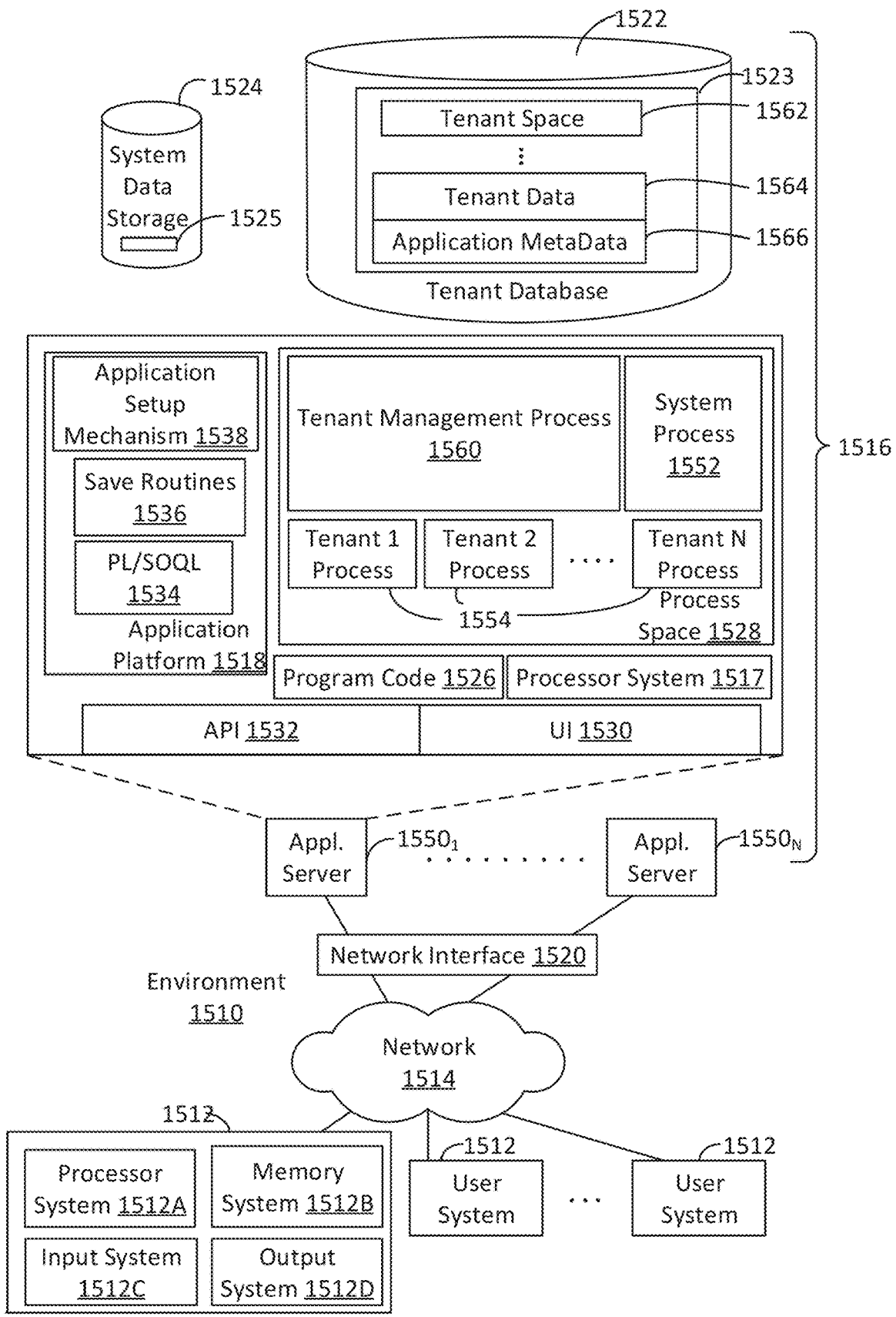
FIG. 15 shows a block diagram of an example of an environment 1510 that includes an on-demand database service configured in accordance with some implementations.

FIG. 15 shows a block diagram of an example of an environment 1510 that includes an on-demand database service configured in accordance with some implementations. Environment 1510 may include user systems 1512, network 1514, database system 1516, processor system 1517, application platform 1518, network interface 1520, tenant data storage 1522, tenant data 1523, system data storage 1524, system data 1525, program code 1526, process space 1528, User Interface (UI) 1530, Application Program Interface (API) 1532, PL/SOQL 1534, save routines 1536, application setup mechanism 1538, application servers 1550-1 through 1550-N, system process space 1552, tenant process spaces 1554, tenant management process space 1560, tenant storage space 1562, user storage 1564, and application metadata 1566. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 1516, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 1518 may be a framework that allows the creation, management, and execution of applications in system 1516. Such applications may be developed by the database service provider or by users or third-party application developers accessing the service. Application platform 1518 includes an application setup mechanism 1538 that supports application developers' creation and management of applications, which may be saved as metadata into tenant data storage 1522 by save routines 1536 for execution by subscribers as one or more tenant process spaces 1554 managed by tenant management process 1560 for example. Invocations to such applications may be coded using PL/SOQL 1534 that provides a programming language style interface extension to API 1532. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 1566 for a subscriber making such an invocation. Such system processes may also manage execution of application metadata 1566 as an application in a virtual machine.

In some implementations, each application server 1550 may handle requests for any user associated with any organization. A load balancing function (e.g., an F5 Big-IP load balancer) may distribute requests to the application servers 1550 based on an algorithm such as least-connections, round robin, observed response time, etc. Each application server 1550 may be configured to communicate with tenant data storage 1522 and the tenant data 1523 therein, and system data storage 1524 and the system data 1525 therein to serve requests of user systems 1512. The tenant data 1523 may be divided into individual tenant storage spaces 1562, which can be either a physical arrangement and/or a logical arrangement of data. Within each tenant storage space 1562, user storage 1564 and application metadata 1566 may be similarly allocated for each user. For example, a copy of a user's most recently used (MRU) items might be stored to user storage 1564. Similarly, a copy of MRU items for an entire tenant organization may be stored to tenant storage space 1562. A GUI 1530 provides a user interface and an API 1532 provides an application programming interface to system 1516 resident processes to users and/or developers at user systems 1512.

System 1516 may implement a web-based user interface generation system. For example, in some implementations, system 1516 may include application servers configured to implement and execute a variety of software applications. The application servers may be configured to provide related data, code, forms, web pages and other information to and from user systems 1512. Additionally, the application servers may be configured to store information to, and retrieve information from a database system. Such information may include related data, objects, and/or Webpage content. With a multi-tenant system, data for multiple tenants may be stored in the same physical database object in tenant data storage 1522, however, tenant data may be arranged in the storage medium(s) of tenant data storage 1522 so that data of one tenant is kept logically separate from that of other tenants. In such a scheme, one tenant may not access another tenant's data, unless such data is expressly shared.

Several elements in the system shown in FIG. 15 include conventional, well-known elements that are explained only briefly here. For example, user system 1512 may include processor system 1512A, memory system 1512B, input system 1512C, and output system 1512D. A user system 1512 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 1512 to access, process and view information, pages and applications available from system 1516 over network 1514. Network 1514 may be any network or combination of networks of devices that communicate with one another, such as any one or any combination of a LAN (local area network), WAN (wide area network), wireless network, or other appropriate configuration.

The users of user systems 1512 may differ in their respective capacities, and the capacity of a particular user system 1512 to access information may be determined at least in part by "permissions" of the particular user system 1512. As discussed herein, permissions generally govern access to computing resources such as data objects, components, and other entities of a computing system, such as a user interface generation system, a social networking system, and/or a CRM database system. "Permission sets" generally refer to groups of permissions that may be assigned to users of such a computing environment. For instance, the assignments of users and permission sets may be stored in one or more databases of System 1516. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 1516 may provide on-demand database service to user systems 1512 using an MTS arrangement. By way of example, one tenant organization may be a company that employs a sales force where each salesperson uses system 1516 to manage their sales process. Thus, a user in such an organization may maintain contact data, leads data, customer follow-up data, performance data, goals and progress data, etc., all applicable to that user's personal sales process (e.g., in tenant data storage 1522). In this arrangement, a user may manage his or her sales efforts and cycles from a variety of devices, since relevant data and applications to interact with (e.g., access, view, modify, report, transmit, calculate, etc.) such data may be maintained and accessed by any user system 1512 having network access.

When implemented in an MTS arrangement, system 1516 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 1516 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 1516 may also maintain system-level data usable by multiple tenants or other data. Such system-level data may include industry reports, news, postings, and the like that are sharable between tenant organizations.

In some implementations, user systems 1512 may be client systems communicating with application servers 1550 to request and update system-level and tenant-level data from system 1516. By way of example, user systems 1512 may send one or more queries requesting data of a database maintained in tenant data storage 1522 and/or system data storage 1524. An application server 1550 of system 1516 may automatically generate one or more SQL statements (e.g., one or more SQL queries) that are designed to access the requested data. System data storage 1524 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 16A:
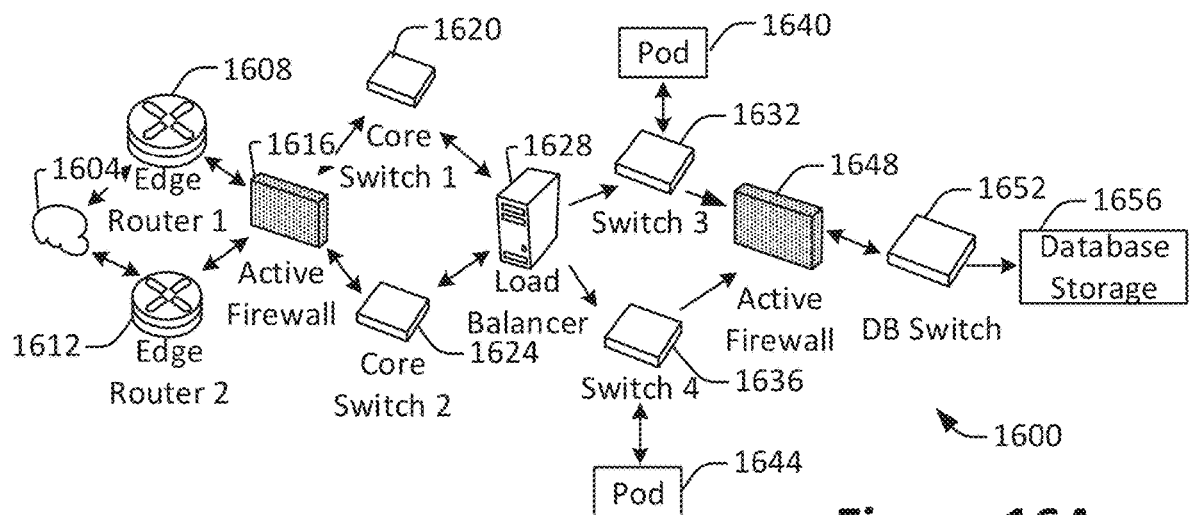
FIG. 16A shows a system diagram of an example of architectural components of an on-demand database service environment 1600, configured in accordance with some implementations.

FIG. 16A shows a system diagram of an example of architectural components of an on-demand database service environment 1600, configured in accordance with some implementations. A client machine located in the cloud 1604 may communicate with the on-demand database service environment via one or more edge routers 1608 and 1612. A client machine may include any of the examples of user systems 1512 described above. The edge routers 1608 and 1612 may communicate with one or more core switches 1620 and 1624 via firewall 1616. The core switches may communicate with a load balancer 1628, which may distribute server load over different pods, such as the pods 1640 and 1644 by communication via pod switches 1632 and 1636. The pods 1640 and 1644, which may each include one or more servers and/or other computing resources, may perform data processing and other operations used to provide on-demand services. Components of the environment may communicate with a database storage 1656 via a database firewall 1648 and a database switch 1652.

Accessing an on-demand database service environment may involve communications transmitted among a variety of different components. The environment 1600 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 16A and 16B.

The cloud 1604 refers to any suitable data network or combination of data networks, which may include the Internet. Client machines located in the cloud 1604 may communicate with the on-demand database service environment 1600 to access services provided by the on-demand database service environment 1600. By way of example, client machines may access the on-demand database service environment 1600 to retrieve, store, edit, and/or process user interface information.

In some implementations, the edge routers 1608 and 1612 route packets between the cloud 1604 and other components of the on-demand database service environment 1600. The edge routers 1608 and 1612 may employ the Border Gateway Protocol (BGP). The edge routers 1608 and 1612 may maintain a table of IP networks or 'prefixes', which designate network reachability among autonomous systems on the internet.

In one or more implementations, the firewall 1616 may protect the inner components of the environment 1600 from internet traffic. The firewall 1616 may block, permit, or deny access to the inner components of the on-demand database service environment 1600 based upon a set of rules and/or other criteria. The firewall 1616 may act as one or more of a packet filter, an application gateway, a stateful filter, a proxy server, or any other type of firewall.

In some implementations, the core switches 1620 and 1624 may be high-capacity switches that transfer packets within the environment 1600. The core switches 1620 and 1624 may be configured as network bridges that quickly route data between different components within the on-demand database service environment. The use of two or more core switches 1620 and 1624 may provide redundancy and/or reduced latency.

In some implementations, communication between the pods 1640 and 1644 may be conducted via the pod switches 1632 and 1636. The pod switches 1632 and 1636 may facilitate communication between the pods 1640 and 1644 and client machines, for example via core switches 1620 and 1624. Also or alternatively, the pod switches 1632 and 1636 may facilitate communication between the pods 1640 and 1644 and the database storage 1656. The load balancer 1628 may distribute workload between the pods, which may assist in improving the use of resources, increasing throughput, reducing response times, and/or reducing overhead. The load balancer 1628 may include multilayer switches to analyze and forward traffic.

In some implementations, access to the database storage 1656 may be guarded by a database firewall 1648, which may act as a computer application firewall operating at the database application layer of a protocol stack. The database firewall 1648 may protect the database storage 1656 from application attacks such as structure query language (SQL) injection, database rootkits, and unauthorized information disclosure. The database firewall 1648 may include a host using one or more forms of reverse proxy services to proxy traffic before passing it to a gateway router and/or may inspect the contents of database traffic and block certain content or database requests. The database firewall 1648 may work on the SQL application level atop the TCP/IP stack, managing applications' connection to the database or SQL management interfaces as well as intercepting and enforcing packets traveling to or from a database network or application interface.

In some implementations, the database storage 1656 may be an on-demand database system shared by many different organizations. The on-demand database service may employ a single-tenant approach, a multi-tenant approach, a virtualized approach, or any other type of database approach. Communication with the database storage 1656 may be conducted via the database switch 1652. The database storage 1656 may include various software components for handling database queries. Accordingly, the database switch

1652 may direct database queries transmitted by other components of the environment (e.g., the pods 1640 and 1644) to the correct components within the database storage 1656.

Figure 16B:
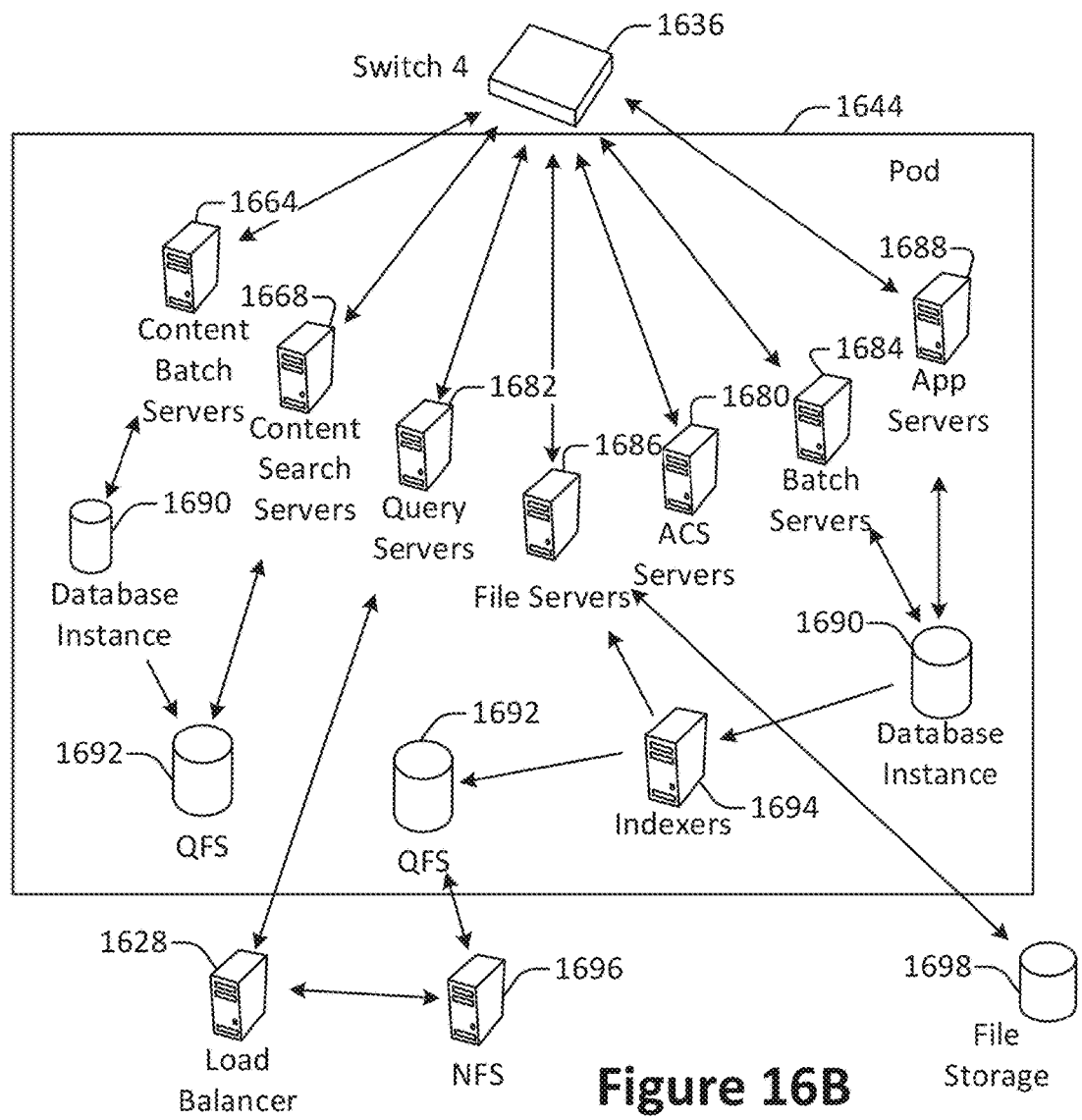
FIG. 16B shows a system diagram further illustrating an example of architectural components of an on-demand database service environment, in accordance with some implementations.

FIG. 16B shows a system diagram further illustrating an example of architectural components of an on-demand database service environment, in accordance with some implementations. The pod 1644 may be used to render services to user(s) of the on-demand database service environment 1600. The pod 1644 may include one or more content batch servers 1664, content search servers 1668, query servers 1682, file servers 1686, access control system (ACS) servers 1680, batch servers 1684, and app servers 1688. Also, the pod 1644 may include database instances 1690, quick file systems (QFS) 1692, and indexers 1694. Some or all communication between the servers in the pod 1644 may be transmitted via the switch 1636.

In some implementations, the app servers 1688 may include a framework dedicated to the execution of procedures (e.g., programs, routines, scripts) for supporting the construction of applications provided by the on-demand database service environment 1600 via the pod 1644. One or more instances of the app server 1688 may be configured to execute all or a portion of the operations of the services described herein.

In some implementations, as discussed above, the pod 1644 may include one or more database instances 1690. A database instance 1690 may be configured as an MTS in which different organizations share access to the same database, using the techniques described above. Database information may be transmitted to the indexer 1694, which may provide an index of information available in the database 1690 to file servers 1686. The QFS 1692 or other suitable filesystem may serve as a rapid-access file system for storing and accessing information available within the pod 1644. The QFS 1692 may support volume management capabilities, allowing many disks to be grouped together into a file system. The QFS 1692 may communicate with the database instances 1690, content search servers 1668 and/or indexers 1694 to identify, retrieve, move, and/or update data stored in the network file systems (NFS) 1696 and/or other storage systems.

In some implementations, one or more query servers 1682 may communicate with the NFS 1696 to retrieve and/or update information stored outside of the pod 1644. The NFS 1696 may allow servers located in the pod 1644 to access information over a network in a manner similar to how local storage is accessed. Queries from the query servers 1622 may be transmitted to the NFS 1696 via the load balancer 1628, which may distribute resource requests over various resources available in the on-demand database service environment 1600. The NFS 1696 may also communicate with the QFS 1692 to update the information stored on the NFS 1696 and/or to provide information to the QFS 1692 for use by servers located within the pod 1644.

In some implementations, the content batch servers 1664 may handle requests internal to the pod 1644. These requests may be long-running and/or not tied to a particular customer, such as requests related to log mining, cleanup work, and maintenance tasks. The content search servers 1668 may provide query and indexer functions such as functions allowing users to search through content stored in the on-demand database service environment 1600. The file servers 1686 may manage requests for information stored in the file storage 1698, which may store information such as documents, images, basic large objects (BLOBs), etc. The query servers 1682 may be used to retrieve information from one or more file systems. For example, the query system 1682 may receive requests for information from the app servers 1688 and then transmit information queries to the NFS 1696 located outside the pod 1644. The ACS servers 1680 may control access to data, hardware resources, or software resources called upon to render services provided by the pod 1644. The batch servers 1684 may process batch jobs, which are used to run tasks at specified times. Thus, the batch servers 1684 may transmit instructions to other servers, such as the app servers 1688, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 17:
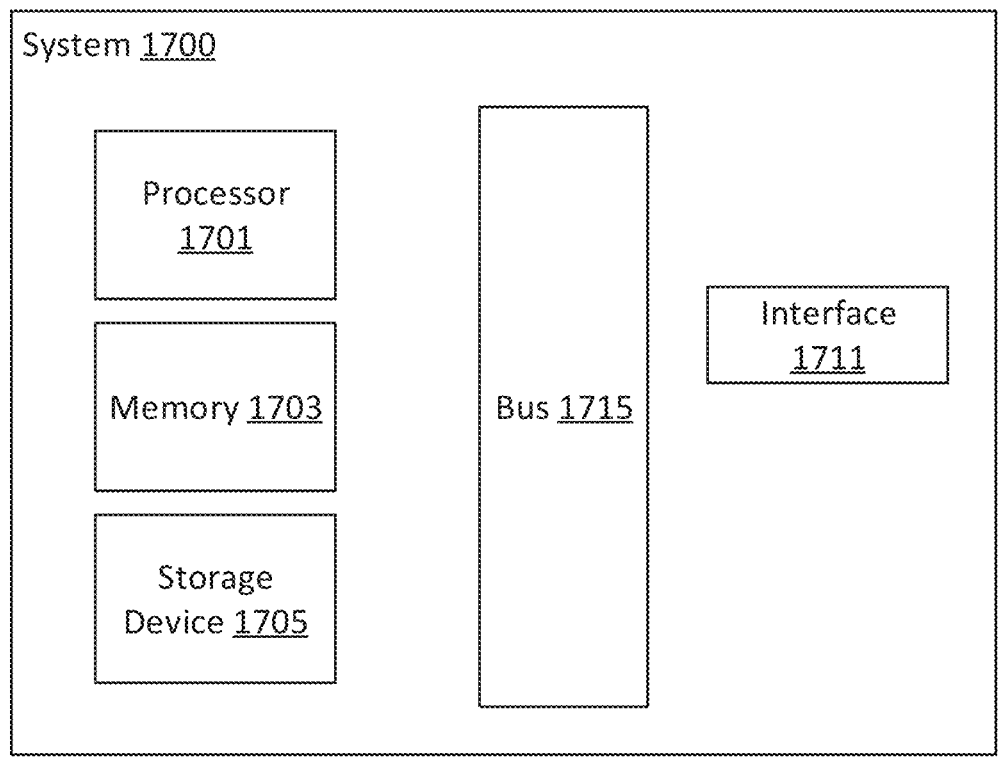
FIG. 17 illustrates one example of a computing device, configured in accordance with one or more embodiments.

FIG. 17 illustrates one example of a computing device. According to various embodiments, a system 1700 suitable for implementing embodiments described herein includes a processor 1701, a memory module 1703, a storage device 1705, an interface 1711, and a bus 1715 (e.g., a PCI bus or other interconnection fabric.) System 1700 may operate as variety of devices such as an application server, a database server, or any other device or service described herein. Although a particular configuration is described, a variety of alternative configurations are possible. The processor 1701 may perform operations such as those described herein. Instructions for performing such operations may be embodied in the memory 1703, on one or more non-transitory computer readable media, or on some other storage device. Various specially configured devices can also be used in place of or in addition to the processor 1701. The interface 1711 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of disclosed herein apply to a wide variety of computing environments. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A method comprising:
presenting on a display screen a graphical user interface including a plurality of components, wherein the plurality of components include a first set of components in a visible state and a second set of components in an invisible state;
detecting a state change event associated with a designated component of the second set of components;
resolving via a processor a designated portion of an abstract data graph based on the state change event, wherein the abstract data graph is received from a remote computing system via a communication interface, wherein the abstract data graph includes a plurality of nodes and a plurality of links between the plurality of nodes, wherein the abstract data graph represents computer programming instructions for generating the graphical user interface, wherein selected links of the plurality of links represent dependency relationships between portions of the graphical user interface, and wherein the designated portion of the abstract data graph includes a designated plurality of nodes corresponding with the designated component; and
updating the graphical user interface so that the designated component is placed in the visible state when an invocation of a JavaScript decorator that includes a reference to the designated component returns a response indicating that the graphical user interface is to be updated.

2. The method recited in claim 1, wherein resolving the designated portion of the abstract data graph involves retrieving one or more data items from the remote computing system.

3. The method recited in claim 2, wherein resolving the designated portion of the abstract data graph comprises identifying a subset of nodes of the plurality of nodes for which all dependency relationships have been satisfied, and wherein the one or more data items are associated with the subset of nodes of the plurality of nodes.

4. The method recited in claim 2, wherein the one or more data items are displayed within the graphical user interface.

5. The method recited in claim 1, wherein the graphical user interface is updated prior to resolving the designated portion of the abstract data graph.

6. The method recited in claim 1, wherein the graphical user interface is updated after resolving the designated portion of the abstract data graph.

7. The method recited in claim 1, wherein the graphical user interface is updated during the resolution of the designated portion of the abstract data graph.

8. The method recited in claim 1, wherein the designated component is an instantiation of an hypertext markup language (HTML) template that is associated with a shadow document object model (DOM) tree and that is controlled by a JavaScript custom element application procedure interface (API).

9. The method recited in claim 1, wherein the designated component is represented by a designated node within the abstract data graph, and wherein resolving the designated portion of the abstract data graph involves resolving one or more nodes that are dependent on the designated node within the abstract data graph.

10. The method recited in claim 1, wherein the graphical user interface is updated when an invocation of a JavaScript decorator that includes a reference to the designated component returns a response indicating that the graphical user interface is to be updated.

11. The method recited in claim 1, wherein a designated node of the plurality of nodes represents a graphical user interface component property, and wherein the graphical user interface component property stores a data value associated with a component within the graphical user interface.

12. The method recited in claim 1, wherein a designated node of the plurality of nodes represents a conditional statement, wherein the conditional statement defines a condition under which a Boolean output value is true, wherein the designated node of the plurality of nodes is linked with one or more dependent nodes of the plurality of nodes, and wherein the one or more dependent nodes of the plurality of nodes are associated with one or more portions of the graphical user interface rendered if the condition is true.

13. The method recited in claim 1, wherein the abstract data graph is received from the remote computing system in response to an initial request for the graphical user interface, and wherein information for rendering the graphical user interface is retrieved from the remote computing system when the abstract data graph is resolved.

14. The method recited in claim 1, wherein the graphical user interface is presented in a native application executed on a mobile computing device.

15. The method recited in claim 1, wherein the graphical user interface is a web page presented within a web browser at a client machine.

16. The method recited in claim 1, wherein the remote computing system is situated within an on-demand computing services environment that provides on-demand computing services to a plurality of entities via the Internet.

17. A computing device comprising:
a display screen operable to present a graphical user interface including a plurality of components, wherein the plurality of components include a first set of components in a visible state and a second set of components in an invisible state; and
a processor operable to detect a state change event associated with a designated component of the second set of components and to resolve a designated portion of an abstract data graph based on the state change event, wherein the abstract data graph is received from a remote computing system via a communication interface, wherein the abstract data graph includes a plurality of nodes and a plurality of links between the plurality of nodes, wherein the abstract data graph represents computer programming instructions for generating the graphical user interface, wherein selected links of the plurality of links represent dependency relationships between portions of the graphical user interface, wherein the designated portion of the abstract data graph includes a designated plurality of nodes corresponding with the designated component, and wherein the graphical user interface is updated so that the designated component is placed in the visible state when an invocation of a JavaScript decorator that includes a reference to the designated component returns a response indicating that the graphical user interface is to be updated.

18. The computing device recited in claim 17, wherein resolving the designated portion of the abstract data graph involves retrieving one or more data items from the remote computing system, wherein resolving the designated portion of the abstract data graph comprises identifying a subset of nodes of the plurality of nodes for which all dependency relationships have been satisfied, wherein the one or more data items are associated with the subset of nodes of the plurality of nodes, and wherein the one or more data items are displayed within the graphical user interface.

19. The computing device recited in claim 17, wherein the designated component is an instantiation of an hypertext markup language (HTML) template that is associated with a shadow document object model (DOM) tree and that is controlled by a JavaScript custom element application procedure interface (API), wherein the designated component is represented by a designated node within the abstract data graph, and wherein resolving the designated portion of the abstract data graph involves resolving one or more nodes that are dependent on the designated node within the abstract data graph.

20. A method comprising:
presenting on a display screen a graphical user interface including a plurality of components, wherein the plurality of components include a first set of components in a visible state and a second set of components in an invisible state;
detecting a state change event associated with a designated component of the second set of components;
resolving via a processor a designated portion of an abstract data graph based on the state change event, wherein the abstract data graph is received from a remote computing system via a communication interface, wherein the abstract data graph includes a plurality of nodes and a plurality of links between the plurality of nodes, wherein the abstract data graph represents computer programming instructions for generating the graphical user interface, wherein selected links of the plurality of links represent dependency relationships between portions of the graphical user interface, wherein the designated portion of the abstract data graph includes a designated plurality of nodes corresponding with the designated component, wherein a designated node of the plurality of nodes represents a conditional statement, wherein the conditional statement defines a condition under which a Boolean output value is true, wherein the designated node of the plurality of nodes is linked with one or more dependent nodes of the plurality of nodes, and wherein the one or more dependent nodes of the plurality of nodes are associated with one or more portions of the graphical user interface rendered if the condition is true; and
updating the graphical user interface so that the designated component is placed in the visible state.

* * * * *